(12) United States Patent
Alexander et al.

(10) Patent No.: US 11,450,998 B2
(45) Date of Patent: Sep. 20, 2022

(54) POWER DISTRIBUTION SYSTEM

(71) Applicant: HERMAN MILLER, INC., Zeeland, MI (US)

(72) Inventors: Brian David Alexander, Douglas, MI (US); Peter James Keyzer, Caledonia, MI (US); Jeffrey Dennis Roetman, West Olive, MI (US); Raymond Hugh Riner, Fort Wayne, IN (US); Gordon Frank Chapman, Avilla, IN (US)

(73) Assignee: MillerKnoll, Inc., Zeeland, MI (US)

( * ) Notice: Subject to any disclaimer, the term of this patent is extended or adjusted under 35 U.S.C. 154(b) by 0 days.

(21) Appl. No.: 17/126,477

(22) Filed: Dec. 18, 2020

(65) Prior Publication Data

US 2021/0104856 A1 Apr. 8, 2021

Related U.S. Application Data

(62) Division of application No. 16/434,823, filed on Jun. 7, 2019, now Pat. No. 10,886,681.

(Continued)

(51) Int. Cl.
*H01R 35/04* (2006.01)
*H01R 25/14* (2006.01)
(Continued)

(52) U.S. Cl.
CPC .......... *H01R 35/04* (2013.01); *H01R 13/112* (2013.01); *H01R 25/14* (2013.01); *H02J 3/00* (2013.01);

(Continued)

(58) Field of Classification Search
CPC ...... H01R 35/04; H01R 13/112; H01R 25/14; H01R 4/64; H01R 13/055; H01R 13/514;
(Continued)

(56) References Cited

U.S. PATENT DOCUMENTS

| 2,117,480 A | 5/1938 | Harvey |
| 2,963,676 A | 12/1960 | Sneesby et al. |

(Continued)

FOREIGN PATENT DOCUMENTS

| EP | 0462329 A2 | 12/1991 |
| EP | 2273635 A2 | 1/2011 |

(Continued)

*Primary Examiner* — Abdullah A Riyami
*Assistant Examiner* — Justin M Kratt
(74) *Attorney, Agent, or Firm* — Michael Best & Friedrich LLP

(57) ABSTRACT

A power distribution system includes a track having a first end, a second end opposite the first end, and a longitudinal axis extending through the first and second ends. The track defines a channel extending along the longitudinal axis. A plurality of power cables is positioned within the channel. The power distribution system further includes an electrical hub having a body coupled to the second end of the track. A plurality of wafers is supported by the body and stacked on top of each other to define a set of terminals. The set of terminals is electrically connected to the plurality of power cables. A power receptacle is supported by the body and electrically connected to the plurality of wafers.

20 Claims, 18 Drawing Sheets

Related U.S. Application Data

(60) Provisional application No. 62/683,387, filed on Jun. 11, 2018.

(51) Int. Cl.
| | | |
|---|---|---|
| *H02J 3/00* | (2006.01) | |
| *H01R 13/11* | (2006.01) | |
| *H01R 25/16* | (2006.01) | |
| *H01R 31/06* | (2006.01) | |
| *H02G 9/02* | (2006.01) | |
| *H02G 3/10* | (2006.01) | |
| *H01R 31/02* | (2006.01) | |
| *H01R 24/66* | (2011.01) | |
| *H02G 3/18* | (2006.01) | |
| *H02G 3/12* | (2006.01) | |
| *H01R 13/518* | (2006.01) | |
| *H01R 13/05* | (2006.01) | |
| *H01R 4/64* | (2006.01) | |
| *H02G 3/04* | (2006.01) | |
| *H01R 24/52* | (2011.01) | |
| *H01R 25/00* | (2006.01) | |
| *H01R 13/514* | (2006.01) | |
| *H01R 13/652* | (2006.01) | |
| *H01R 24/20* | (2011.01) | |
| *H01R 13/659* | (2011.01) | |
| *H02G 3/00* | (2006.01) | |
| *A47B 21/06* | (2006.01) | |
| *H01R 24/76* | (2011.01) | |
| *H02G 3/08* | (2006.01) | |
| *H02G 3/34* | (2006.01) | |

(52) U.S. Cl.
CPC ............... *A47B 21/06* (2013.01); *H01R 4/64* (2013.01); *H01R 13/055* (2013.01); *H01R 13/514* (2013.01); *H01R 13/518* (2013.01); *H01R 13/652* (2013.01); *H01R 13/659* (2013.01); *H01R 24/20* (2013.01); *H01R 24/52* (2013.01); *H01R 24/66* (2013.01); *H01R 24/76* (2013.01); *H01R 25/003* (2013.01); *H01R 25/006* (2013.01); *H01R 25/142* (2013.01); *H01R 25/145* (2013.01); *H01R 25/16* (2013.01); *H01R 25/161* (2013.01); *H01R 25/162* (2013.01); *H01R 25/164* (2013.01); *H01R 25/167* (2013.01); *H01R 31/02* (2013.01); *H01R 31/06* (2013.01); *H01R 31/065* (2013.01); *H02G 3/00* (2013.01); *H02G 3/0431* (2013.01); *H02G 3/0437* (2013.01); *H02G 3/0493* (2013.01); *H02G 3/08* (2013.01); *H02G 3/10* (2013.01); *H02G 3/123* (2013.01); *H02G 3/18* (2013.01); *H02G 3/185* (2013.01); *H02G 3/34* (2013.01); *H02G 9/025* (2013.01)

(58) Field of Classification Search
CPC .. H01R 13/518; H01R 13/652; H01R 13/659; H01R 24/20; H01R 24/52; H01R 24/66; H01R 24/76; H01R 25/003; H01R 25/006; H01R 25/142; H01R 25/145; H01R 25/16; H01R 25/161; H01R 25/162; H01R 25/164; H01R 25/167; H01R 31/02; H01R 31/06; H01R 31/065; H01R 25/00; H01R 2103/00; H01R 25/168; H01R 13/73; H02J 3/00; A47B 21/06; H02G 3/00; H02G 3/0431; H02G 3/0437; H02G 3/0493; H02G 3/08; H02G 3/10; H02G 3/123; H02G 3/18; H02G 3/185; H02G 3/34; H02G 9/025; H02G 3/288; H02G 3/128; H02G 3/283; H02G 3/0487; H02G 3/0608; H02G 3/105; H02G 3/38; H02G 3/383
See application file for complete search history.

(56) References Cited

U.S. PATENT DOCUMENTS

| | | |
|---|---|---|
| 3,187,290 A | 6/1965 | Winders |
| 3,459,874 A | 8/1969 | Fouse et al. |
| 3,464,052 A | 8/1969 | Arthur |
| 3,683,100 A | 8/1972 | Deal et al. |
| 3,792,189 A | 2/1974 | Stengel et al. |
| 3,809,966 A | 5/1974 | Tirrell |
| 3,984,621 A | 10/1976 | Propst |
| 4,043,626 A | 8/1977 | Propst et al. |
| 4,135,775 A | 1/1979 | Driscoll |
| 4,146,287 A | 3/1979 | Jonsson |
| 4,176,896 A | 12/1979 | Wehling |
| 4,245,873 A | 1/1981 | Markowitz |
| 4,245,874 A | 1/1981 | Bishop |
| 4,255,611 A | 3/1981 | Propst et al. |
| 4,278,834 A | 7/1981 | Boundy |
| 4,295,697 A | 10/1981 | Grime |
| 4,313,646 A | 2/1982 | Millhimes et al. |
| 4,399,371 A | 8/1983 | Ziff et al. |
| 4,494,808 A | 1/1985 | Widell et al. |
| 4,630,417 A | 12/1986 | Collier |
| 4,684,186 A | 8/1987 | Hetherington |
| 4,688,869 A | 8/1987 | Kelly |
| 4,703,386 A | 10/1987 | Speet et al. |
| 4,740,167 A | 4/1988 | Millhimes et al. |
| 4,775,328 A | 10/1988 | McCarthy |
| 4,775,802 A | 10/1988 | Dods |
| 4,780,094 A | 10/1988 | Batty et al. |
| 4,814,941 A | 3/1989 | Speet et al. |
| 4,825,540 A | 5/1989 | Kelly |
| 4,866,757 A | 9/1989 | Nilssen |
| 4,874,322 A | 10/1989 | Dola et al. |
| 4,875,871 A | 10/1989 | Booty, Sr. et al. |
| 4,918,886 A | 4/1990 | Benoit et al. |
| 4,952,164 A | 8/1990 | Weber et al. |
| 4,969,838 A | 11/1990 | Himes, Jr. et al. |
| 5,024,610 A | 6/1991 | French et al. |
| 5,024,614 A | 6/1991 | Dola et al. |
| 5,043,531 A | 6/1991 | Gutenson et al. |
| 5,041,002 A | 8/1991 | Byrne |
| 5,044,971 A | 8/1991 | Hollingsworth |
| 5,046,963 A | 9/1991 | Kelly |
| 5,063,473 A | 9/1991 | Hall et al. |
| 5,068,890 A | 11/1991 | Nilssen |
| 5,070,522 A | 11/1991 | Nilssen |
| 5,073,120 A | 12/1991 | Lincoln et al. |
| 5,092,787 A | 3/1992 | Wise et al. |
| 5,104,332 A | 3/1992 | Mccoy |
| 5,107,410 A | 4/1992 | Marsh et al. |
| 5,131,860 A | 4/1992 | Bogiel |
| 5,141,447 A | 7/1992 | Poirier |
| 5,149,277 A | 8/1992 | Lemaster |
| 5,152,698 A | 9/1992 | Juhlin et al. |
| 5,157,273 A | 10/1992 | Medendorp et al. |
| 5,203,711 A | 4/1993 | Bogiel |
| 5,203,713 A | 4/1993 | French et al. |
| 5,210,788 A | 4/1993 | Nilssen |
| 5,252,086 A | 5/1993 | Rsell et al. |
| 5,277,609 A | 1/1994 | Ondrejka |
| 5,318,454 A | 1/1994 | Deer et al. |
| 5,322,444 A | 6/1994 | Audehm et al. |
| 5,336,097 A | 6/1994 | Williamson, Jr. et al. |
| 5,340,326 A | 8/1994 | Lemaster |
| 5,357,055 A | 8/1994 | Sireci |
| 5,362,923 A | 10/1994 | Newhouse et al. |
| 5,394,658 A | 3/1995 | Schreiner et al. |
| 5,396,027 A | 3/1995 | Zemen et al. |
| 5,477,091 A | 3/1995 | Fiorina et al. |
| 5,503,565 A | 4/1996 | Mccoy |
| 5,537,309 A | 4/1996 | Marsh et al. |

(56) References Cited

U.S. PATENT DOCUMENTS

| | | | |
|---|---|---|---|
| 5,539,632 A | 7/1996 | Marsh | |
| 5,582,522 A | 7/1996 | Johnson | |
| 5,584,714 A | 12/1996 | Karst et al. | |
| 5,618,192 A | 4/1997 | Drury | |
| 5,623,531 A | 4/1997 | Nilssen | |
| 5,661,263 A | 8/1997 | Salvaggio | |
| 5,661,802 A | 8/1997 | Nilssen | |
| 5,670,743 A | 8/1997 | Welch et al. | |
| 5,675,194 A | 9/1997 | Domigan | |
| 5,760,339 A | 6/1998 | Faulkner et al. | |
| 5,783,779 A | 7/1998 | Graham et al. | |
| 5,901,512 A | 5/1999 | Bullwinkle | |
| 5,963,457 A | 5/1999 | Kanoi et al. | |
| 5,974,742 A | 10/1999 | Schreiner | |
| 5,999,094 A | 11/1999 | Nilssen | |
| 6,028,267 A | 2/2000 | Byrne | |
| 6,061,609 A | 5/2000 | Kanoi et al. | |
| 6,073,003 A | 6/2000 | Nilssen | |
| 6,114,623 A | 9/2000 | Bonilla et al. | |
| 6,150,737 A | 11/2000 | Nilssen | |
| 6,167,278 A | 12/2000 | Nilssen | |
| 6,189,268 B1 | 2/2001 | Carr et al. | |
| 6,350,135 B1 | 2/2002 | Acklin et al. | |
| 6,364,678 B1 | 4/2002 | Hellwig et al. | |
| 6,367,211 B1 | 4/2002 | Weener et al. | |
| 6,388,190 B1 | 5/2002 | Laukhuf et al. | |
| 6,454,609 B1 | 9/2002 | Huang | |
| 6,490,829 B1 | 12/2002 | Schreiner et al. | |
| 6,497,075 B1 | 12/2002 | Schreiner et al. | |
| 6,514,652 B2 | 2/2003 | Cash, Jr. | |
| 6,530,791 B1 | 3/2003 | Hierzer | |
| 6,558,190 B1 | 5/2003 | Pierson et al. | |
| 6,575,777 B2 | 6/2003 | Henriott et al. | |
| 6,617,708 B2 | 9/2003 | Boost | |
| 6,652,303 B2 | 11/2003 | Stockel et al. | |
| 6,663,435 B2 | 12/2003 | Lincoln, III et al. | |
| 6,733,331 B2 * | 5/2004 | McCoy | H01R 9/2491 439/535 |
| 6,797,885 B2 | 9/2004 | Magyar et al. | |
| 6,827,592 B2 | 12/2004 | McCoy et al. | |
| 6,902,415 B2 | 6/2005 | Ramsey et al. | |
| 6,939,153 B1 | 9/2005 | Kondas et al. | |
| 7,008,248 B2 | 3/2006 | Kondas et al. | |
| 7,108,532 B2 | 9/2006 | Lubkert | |
| 7,114,971 B1 | 10/2006 | Johnson et al. | |
| 7,131,541 B2 | 11/2006 | Riner | |
| 7,183,502 B1 | 2/2007 | Johnston et al. | |
| 7,183,504 B2 | 2/2007 | Byrne | |
| 7,191,981 B2 | 3/2007 | Laib et al. | |
| 7,192,289 B2 | 3/2007 | Kowalski | |
| 7,219,423 B2 | 5/2007 | Johnson et al. | |
| 7,265,291 B1 | 9/2007 | Gorman | |
| 7,278,360 B2 | 10/2007 | Griepentrog | |
| 7,303,417 B2 | 12/2007 | Lubkert | |
| 7,323,882 B1 | 1/2008 | Hayes et al. | |
| 7,332,683 B2 | 2/2008 | Gorman | |
| 7,344,392 B2 | 3/2008 | Rubin | |
| 7,356,924 B2 | 4/2008 | Johnson et al. | |
| 7,361,051 B2 | 4/2008 | Gorman | |
| 7,410,379 B1 | 8/2008 | Byrne | |
| 7,419,388 B2 | 9/2008 | Rubin | |
| 7,527,521 B2 | 5/2009 | Rubin | |
| 7,544,076 B2 | 6/2009 | Lubkert | |
| 7,563,117 B2 | 7/2009 | Riner | |
| 7,614,896 B2 | 11/2009 | Johnson et al. | |
| 7,621,774 B2 | 11/2009 | Hayes et al. | |
| 7,648,379 B2 | 1/2010 | Johnson et al. | |
| 7,651,353 B2 | 1/2010 | Laukhuf | |
| 7,697,268 B2 | 4/2010 | Johnson et al. | |
| 7,699,631 B2 | 4/2010 | Knepper | |
| 7,758,358 B1 | 7/2010 | Mier-Langner et al. | |
| 7,762,836 B2 | 7/2010 | Rubin | |
| 7,762,838 B2 | 7/2010 | Gorman | |
| 7,826,202 B2 | 11/2010 | Johnson et al. | |
| 7,827,920 B2 | 11/2010 | Beck et al. | |
| 7,841,878 B2 | 11/2010 | Johnson et al. | |
| 7,871,280 B2 | 1/2011 | Henriott | |
| 7,873,062 B2 | 1/2011 | Binder | |
| 7,893,567 B1 | 2/2011 | Deros et al. | |
| 7,922,508 B2 | 4/2011 | Kondas | |
| 7,946,883 B2 | 5/2011 | Hayes et al. | |
| 7,975,624 B2 | 7/2011 | Henriott | |
| 8,028,408 B2 | 10/2011 | Gorman | |
| 8,092,258 B2 | 1/2012 | Binder | |
| 8,146,229 B2 | 4/2012 | Henriott et al. | |
| 8,157,574 B2 | 4/2012 | Hsiao | |
| 8,172,588 B2 | 5/2012 | Johnson et al. | |
| 8,172,589 B2 | 5/2012 | Johnson et al. | |
| 8,235,755 B2 | 8/2012 | Binder | |
| 8,258,412 B2 | 9/2012 | Hayes et al. | |
| 8,330,056 B2 | 12/2012 | Ty et al. | |
| 8,341,837 B2 | 1/2013 | Braunstein et al. | |
| 8,347,585 B2 | 1/2013 | Meisel et al. | |
| 8,360,810 B2 | 1/2013 | Binder | |
| 8,444,425 B2 | 5/2013 | Byrne | |
| 8,495,869 B2 | 7/2013 | Beissler et al. | |
| 8,496,492 B2 | 7/2013 | Byrne | |
| 8,529,289 B2 | 9/2013 | Zien et al. | |
| 8,585,419 B2 | 11/2013 | Byrne | |
| 8,591,264 B2 | 11/2013 | Binder | |
| 8,616,921 B2 * | 12/2013 | Byrne | H01R 25/003 439/652 |
| 8,662,695 B2 | 3/2014 | Wilson | |
| 8,790,126 B2 | 7/2014 | Byrne | |
| 8,862,281 B2 | 10/2014 | Yoneda et al. | |
| 8,910,377 B2 | 12/2014 | Gorman | |
| D738,308 S | 9/2015 | Sumwait et al. | |
| D738,309 S | 9/2015 | Sumwait et al. | |
| D738,311 S | 9/2015 | Sumwait et al. | |
| 9,166,308 B2 | 10/2015 | Byrne | |
| 9,184,546 B2 | 11/2015 | Fleisig | |
| D746,237 S | 12/2015 | Sumwait et al. | |
| D746,238 S | 12/2015 | Sumwait et al. | |
| 9,222,255 B2 | 12/2015 | Johnson et al. | |
| 9,223,336 B2 | 12/2015 | Petersen et al. | |
| D761,733 S | 7/2016 | Sumwait et al. | |
| D762,177 S | 7/2016 | Sumwait et al. | |
| 9,438,017 B2 | 9/2016 | Irons et al. | |
| 9,685,730 B2 | 6/2017 | Jones et al. | |
| 9,787,016 B2 | 10/2017 | Elmvang | |
| 9,960,554 B2 | 5/2018 | Strong | |
| 10,050,424 B2 | 8/2018 | Jones et al. | |
| 10,333,284 B2 | 6/2019 | Schneider et al. | |
| 10,886,681 B2 | 1/2021 | Alexander et al. | |
| 2003/0194907 A1 | 10/2003 | Riner et al. | |
| 2004/0003545 A1 | 1/2004 | Gillespie | |
| 2004/0130218 A1 | 7/2004 | Locke | |
| 2006/0179739 A1 | 8/2006 | Lubkert | |
| 2008/0041281 A1 | 2/2008 | Griepentrog | |
| 2008/0207062 A1 | 8/2008 | Byrne | |
| 2008/0214033 A1 | 9/2008 | Byrne | |
| 2008/0280470 A1 | 11/2008 | Byrne | |
| 2008/0280475 A1 | 11/2008 | Byrne | |
| 2009/0152001 A1 | 6/2009 | Michlovic | |
| 2009/0221169 A1 | 9/2009 | Byrne | |
| 2009/0239402 A1 | 9/2009 | Byrne | |
| 2009/0239403 A1 | 9/2009 | Byrne | |
| 2010/0068908 A1 | 3/2010 | Byrne | |
| 2011/0104922 A1 | 5/2011 | Byrne | |
| 2011/0249420 A1 | 10/2011 | Prim | |
| 2012/0064747 A1 | 3/2012 | Byrne | |
| 2012/0184132 A1 | 7/2012 | Katou et al. | |
| 2013/0021720 A1 | 1/2013 | Ty et al. | |
| 2013/0238153 A1 | 9/2013 | Warwick et al. | |
| 2014/0179132 A1 | 6/2014 | Byrne | |
| 2016/0043520 A1 | 2/2016 | Strong | |
| 2016/0079721 A1 | 3/2016 | Jones et al. | |
| 2017/0237244 A1 | 8/2017 | Jones et al. | |
| 2018/0024835 A1 | 1/2018 | Strong | |
| 2018/0316167 A1 | 11/2018 | Schneider et al. | |

(56) References Cited

U.S. PATENT DOCUMENTS

2019/0260193 A1  8/2019  Schneider et al.
2019/0273346 A1  9/2019  Strong

FOREIGN PATENT DOCUMENTS

| WO | WO1995006969 A1 | 3/1995 |
| WO | WO9510871 A1 | 4/1995 |
| WO | WO2013169650 A1 | 11/2013 |
| WO | WO2016040943 A1 | 3/2016 |

* cited by examiner

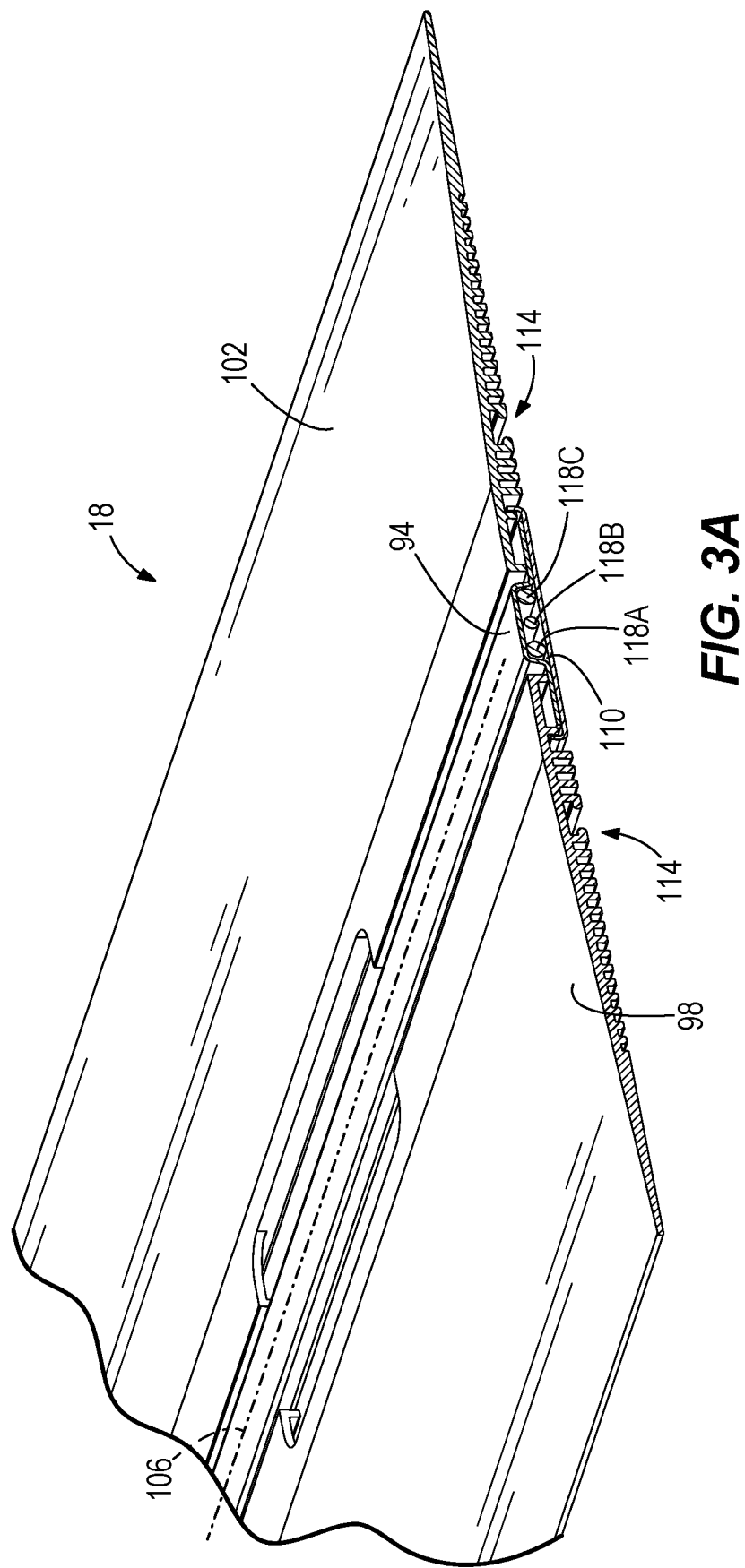

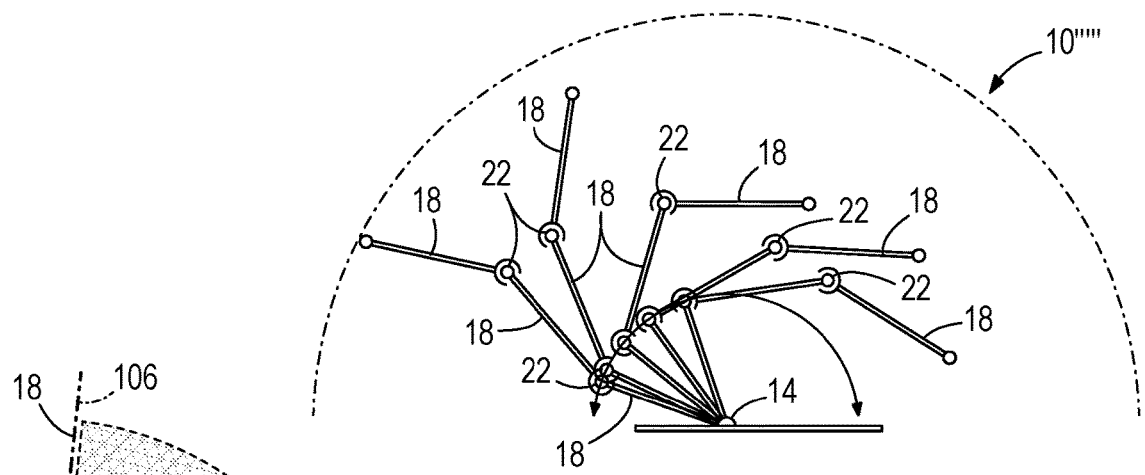
FIG. 12
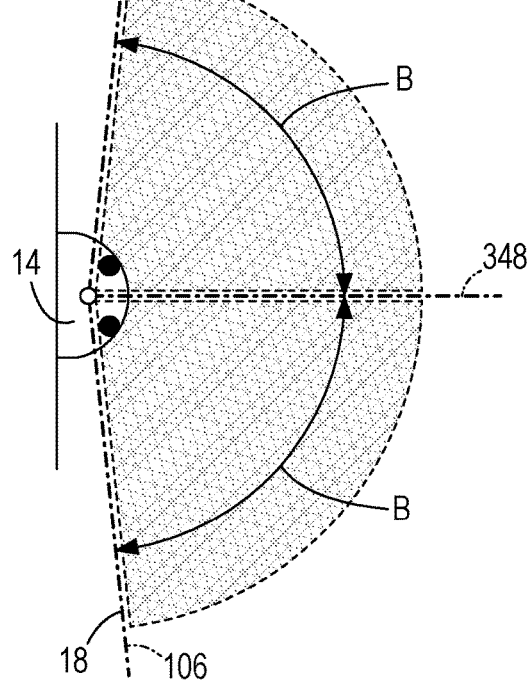
FIG. 13
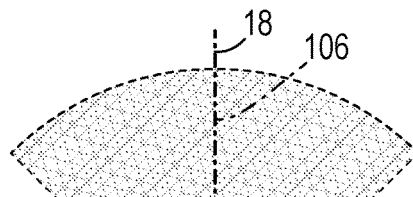
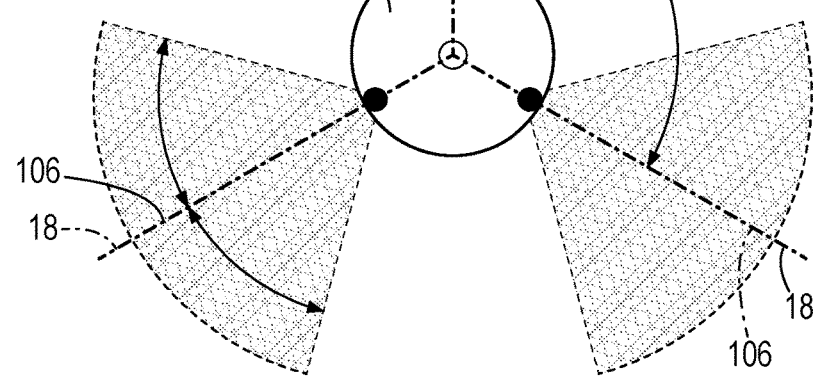
FIG. 14

POWER DISTRIBUTION SYSTEM

CROSS-REFERENCE TO RELATED APPLICATIONS

This application is a divisional of U.S. Non-Provisional patent application Ser. No. 16/434,823, filed Jun. 7, 2019, which claims the benefit of U.S. Provisional Patent Application No. 62/683,387, filed Jun. 11, 2018, the entire contents of each of which are incorporated by reference herein.

FIELD OF THE INVENTION

The present invention relates to a power distribution system, and more particularly to a power distribution system operable to provide power to different locations in a room.

SUMMARY

In one embodiment, the invention provides a power distribution system including a track having a first end, a second end opposite the first end, and a longitudinal axis extending through the first and second ends. The track defines a channel extending along the longitudinal axis. A plurality of power cables is positioned within the channel. An electrical hub is movably coupled to the second end of the track. The electrical hub is electrically connected to the plurality of power cables and includes a power receptacle. The electrical hub is movable relative to the second end of the track to change a position of the power receptacle relative to the track.

In another embodiment, the invention provides a power distribution system including a track having a first end, a second end opposite the first end, and a longitudinal axis extending through the first and second ends. The track defines a channel extending along the longitudinal axis. A plurality of power cables is positioned within the channel. The power distribution system further includes an electrical hub having a body coupled to the second end of the track. A plurality of wafers is supported by the body and stacked on top of each other to define a set of terminals. The set of terminals is electrically connected to the plurality of power cables. A power receptacle is supported by the body and electrically connected to the plurality of wafers.

In yet another embodiment, the invention provides a power distribution system including a first track having a first end configured to be connected to a power supply, a second end opposite the first end, and a first longitudinal axis extending through the first and second ends. The first track defines a first channel extending along the first longitudinal axis. A first plurality of power cables is positioned within the first channel to receive power from the power supply. The power distribution system includes an electrical hub including a body movably coupled to the second end of the first track, and a plurality of wafers supported by the body and stacked on top of each other to define a set of input terminals and a set of output terminals. The set of input terminals is electrically connected to the first plurality of power cables. The electrical hub further includes a power receptacle supported by the body and electrically connected to the plurality of wafers. The power distribution system further includes a second track having a third end movably coupled to the body of the electrical hub, a fourth end opposite the third end, and a second longitudinal axis extending through the third and fourth ends. The second track defines a second channel. A second plurality of power cables is positioned within the second channel. The second plurality of power cables is electrically connected to the set of output terminals. The first longitudinal axis of the first track and the second longitudinal axis of the second track define an angle therebetween. The angle is adjustable by moving the first track, the second track, or both relative to the electrical hub.

Other aspects of the invention will become apparent by consideration of the detailed description and accompanying drawings.

BRIEF DESCRIPTION OF THE DRAWINGS

FIG. 3A is a perspective cross-sectional view of a portion of the track of FIG. 1.

FIG. 12 is a schematic view of the power distribution system including the power entry node, three tracks, and two electrical hubs positionable in a plurality of configurations.

FIG. 13 is a schematic view of the power entry node and two tracks showing a range of motion of the tracks.

FIG. 14 is a schematic view of the electrical hub and three tracks, showing a range of motion of the tracks.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
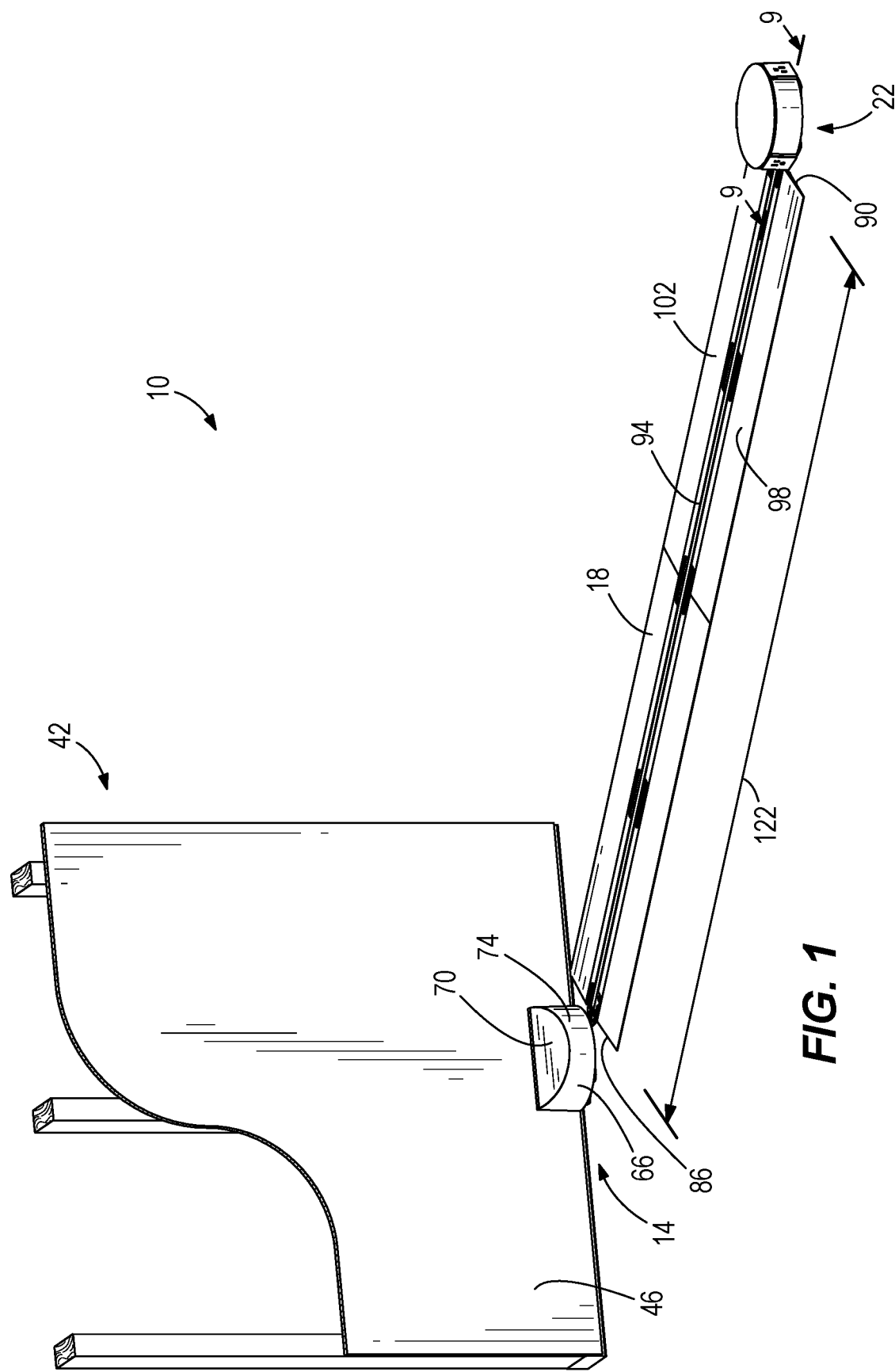
FIG. 1 is a perspective view of a power distribution system embodying the invention, the power distribution system including a power entry node, a track, and an electrical hub.

FIG. 1 illustrates a power distribution system 10. The power distribution system 10 can be positioned within any room of a building, such as an office, a school, a library, and the like, to selectively provide power to any location in the room. The power distribution system 10 includes a power entry node 14, one or more tracks 18, and one or more electrical hubs 22 (may also be termed as "node") movably coupled to the track 18. The power distribution system 10 is configured to distribute power beneath a floor covering (e.g., carpet, rug, vinyl, etc.) of the room. Specifically, the tracks 18 are positioned under the floor covering, and the electrical hubs 22 are accessible to an end user above the floor covering.

Figure 2:
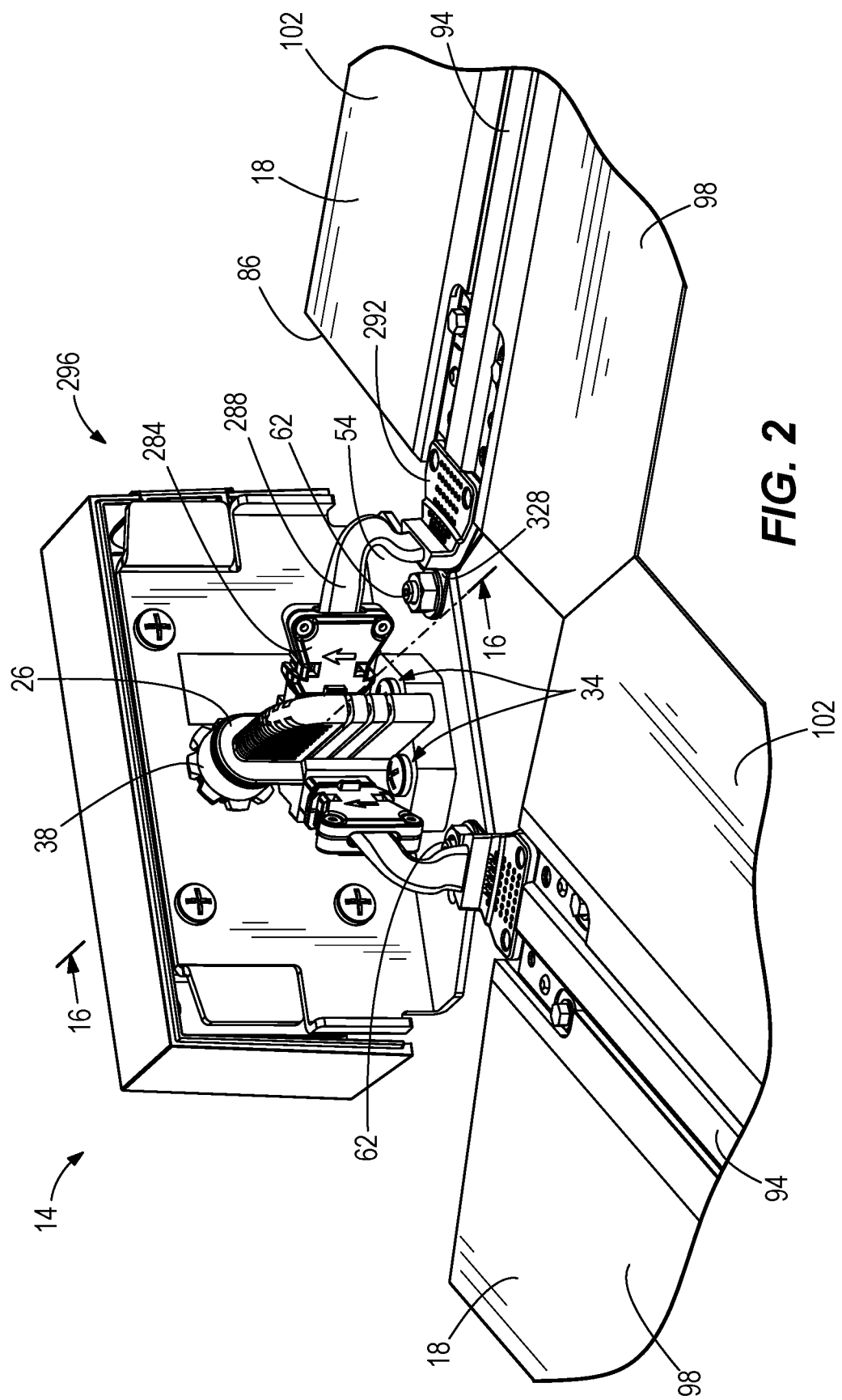
FIG. 2 is a partial perspective view of the power distribution system including two tracks extending from the power entry node.
Figure 15:
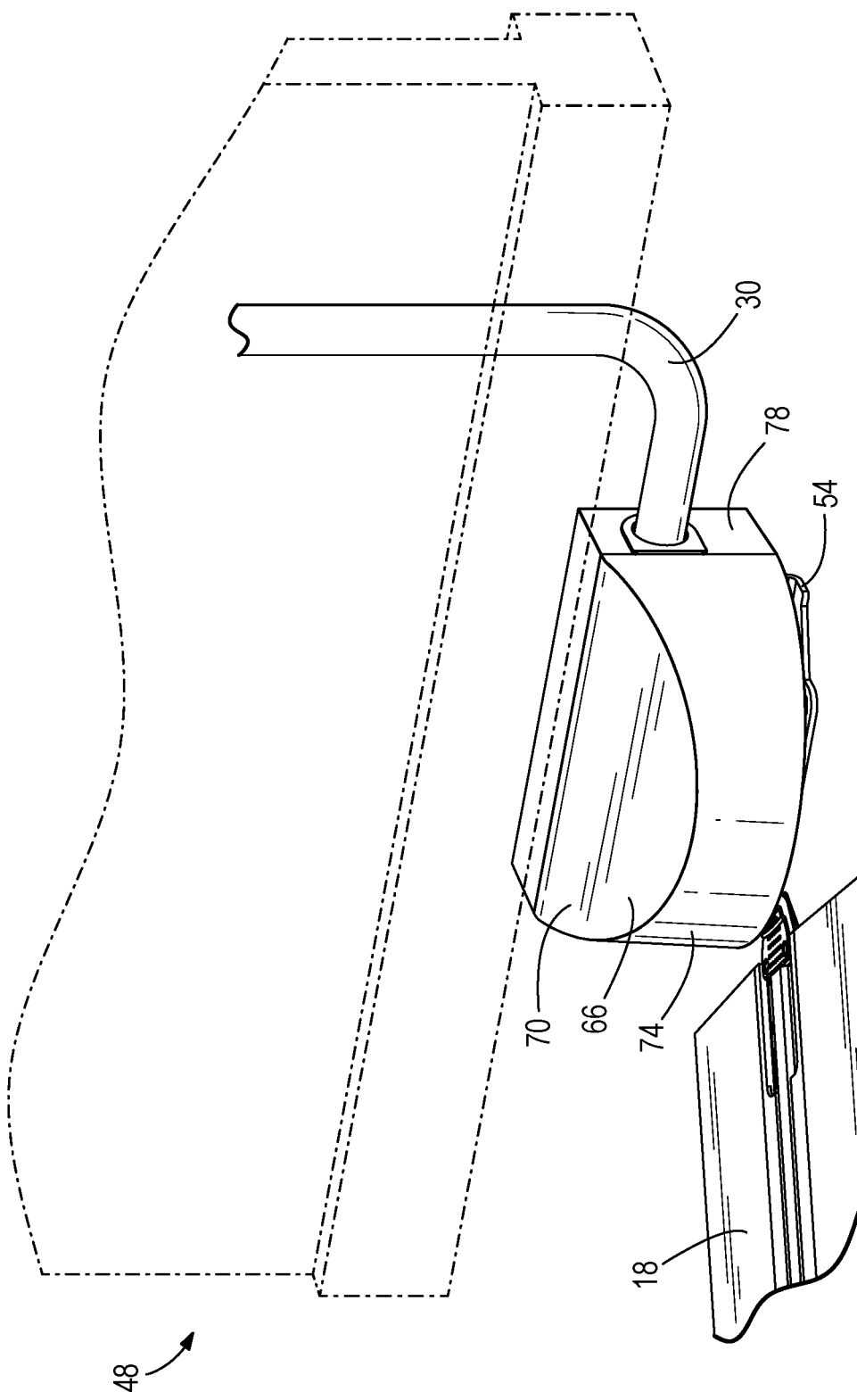
FIG. 15 is a perspective view of another power entry node embodying the invention.
Figure 16:
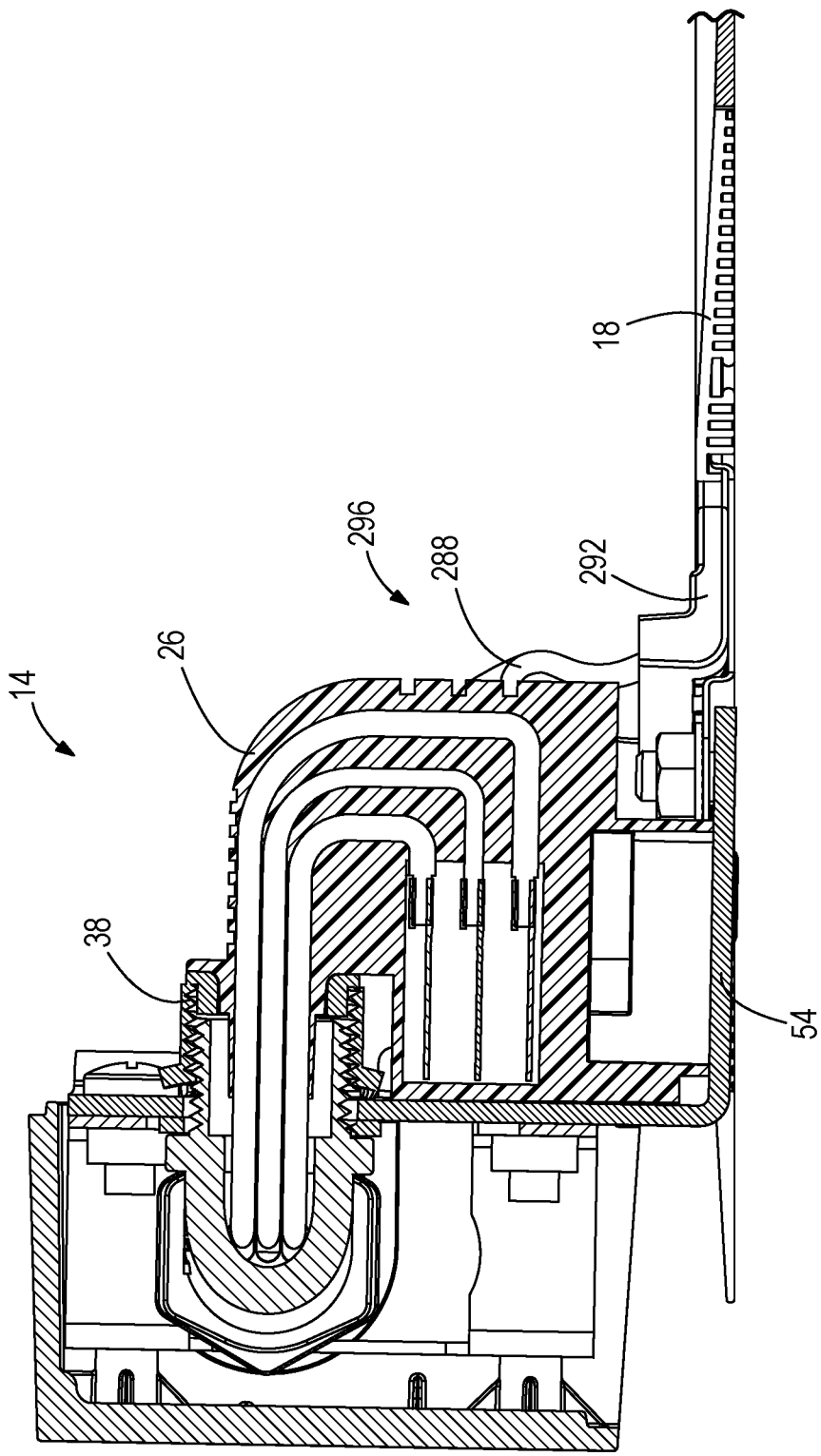
FIG. 16 is a cross-sectional view of the power entry node of FIG. 2 taken along line 16-16 in FIG. 2.

With reference to FIGS. 1, 2, and 16, the power entry node 14 includes a power terminal member 26. The power terminal member 26 is coupled to a conduit 30 (FIG. 15) of a power supply. The power terminal member 26 includes at least one set of terminals 34. The illustrated power terminal member 26 includes two sets of terminals 34 (FIG. 2). Furthermore, the illustrated power terminal member 26 is formed by overmolding such that the power terminal member 26 is configured to form the sets of terminals 34 during fabrication. The power terminal member 26 is securely coupled to a conduit fitting 38. In the illustrated embodiment, the power terminal member 26 is coupled to the conduit fitting 38 by press-fitting, forming a water-tight seal between the power terminal member 26 and the conduit fitting 38.

With continued reference to FIGS. 1, 2, and 16, the power entry node 14 (e.g., the power terminal member 26) is electrically connected to the power supply. Specifically, wires from the power supply extend through the conduit 30 and the power terminal member 26 to the sets of terminals 34 for electrically connecting the power entry node 14 to the power supply. The connection is a hardwire connection (i.e., a relatively permanent connection) to the power supply. The power supply may be a building's power supply or other power system. For example, as shown in FIG. 1, the power entry node 14 is mounted to a wall 46 in a room 42. In such embodiments, the power entry node 14 receives power from the building. In other embodiments, such as the embodiment shown in FIG. 15, the power entry node 14 may be mounted to a furniture system 48. In such embodiments, the power entry node 14 receives power from the furniture system 48, which may receive power from the building or from a portable power source (e.g., a generator, a battery array, etc.). Mounting the power entry node 14 to the furniture system 48 rather than the wall 46 allows the power distribution system 10 to start at a central area of the room, rather than at the perimeter of the room. In one example of such an embodiment, the power entry node 14 is electrically connected to a power harness of the furniture system 48. In this embodiment, the connection may be a modular connection to the furniture system 48.

The power entry node 14 includes a flange 54. The flange 54 supports the power terminal member 26. As shown in FIG. 2, the illustrated flange 54 extends perpendicular to the power terminal member 26. The power terminal member 26 may be removably attached to the flange 54 such as by fasteners. The flange 54 further includes at least one pin 62 (two pins 62 are shown in FIG. 2) extending vertically from the flange 54. The pins 62 movably couple the tracks 18 to the power entry node 14. The flange 54 is configured to be positioned adjacent and supported by the floor surface 50.

With reference to FIGS. 1 and 15, the power entry node 14 further includes a cover 66. The cover 66 (FIG. 1) encloses the power terminal member 26. The illustrated cover 66 is semi-cylindrical and includes a top portion 70 and a side portion 74 extending from the top portion 70 to partially surround the power terminal member 26. As shown in FIG. 15, the cover 66 may further include a rear portion 78 configured to enclose a back side of the power entry node 14. Specifically, the power entry node 14 may be positioned under the furniture system 48 or a partial wall of the building in which the back side of the power entry node 14 is exposed. The illustrated rear portion 78 has a substantially box shape. The rear portion 78 covers the back side of the power entry node 14 to enhance the aesthetics of the node 14. In some embodiments, the rear portion 78 may help support the conduit 30 of the power supply.

With reference to FIGS. 1-3A, the track 18 extends from the power entry node 14. The track 18 includes a first end 86 and a second end 90 opposite the first end 86 (FIG. 1). The first and second ends 86, 90 are configured to adjustably attach to the power entry node 14 or the electrical hub 22. The illustrated track 18 includes a plurality of portions 94, 98, 102 extending between the first and second ends 86, 90. A first, central portion 94 is positioned between second and third, outer portions 98, 102. The illustrated second and third portions 98, 102 extend at an angle relative to the floor surface 50 such that the second and third portions 98, 102 are ramped (FIG. 3A) to a height of the first portion 94. As such, the second and third portions 98, 102 provide a smooth transition from the floor surface 50 to the height of the center portion 94.

The track 18 defines a longitudinal axis 106 extending through the first and second ends 86, 90. Furthermore, the track 18 defines a plurality of channels 110, 114 extending parallel to the longitudinal axis 106 (FIG. 3A). The illustrated first portion 94 defines a main channel 110. Each of the illustrated second and third portions 98, 102 defines an auxiliary channel 114. The channels 110, 114 extend between the first and second ends 86, 90. In addition, each of the auxiliary channels 114 is spaced apart from the main channel 110. The auxiliary channels 114 are further defined by an inner surface of the second and third portions 98, 102. In further embodiments, the track 18 may include fewer or more channels. For example, the track 18 may include multiple, discrete channels within the first portion 94 and/or the auxiliary channels 114 in the second and third portions 98, 102 may be omitted.

With particular reference to FIG. 3A, a plurality of power cables 118A, 118B, 118C is positioned within the main channel 110. The illustrated main channel 110 includes three power cables 118A, 118B, 118C (e.g., ground, hot, and neutral). The power cables 118A, 118B, 118C are electrically connected to the power entry node 14 and the electrical hub 22. As such, the power cables 118A, 118B, 118C receive power from the power entry node 14 (i.e., the power supply of the building, the furniture system, etc.), and supply power to the electrical hub 22. In some embodiments, each of the auxiliary channels 114 receives one or more data cables to supply a data connection from the power entry node 14 to the electrical hub 22.

Figure 3B:
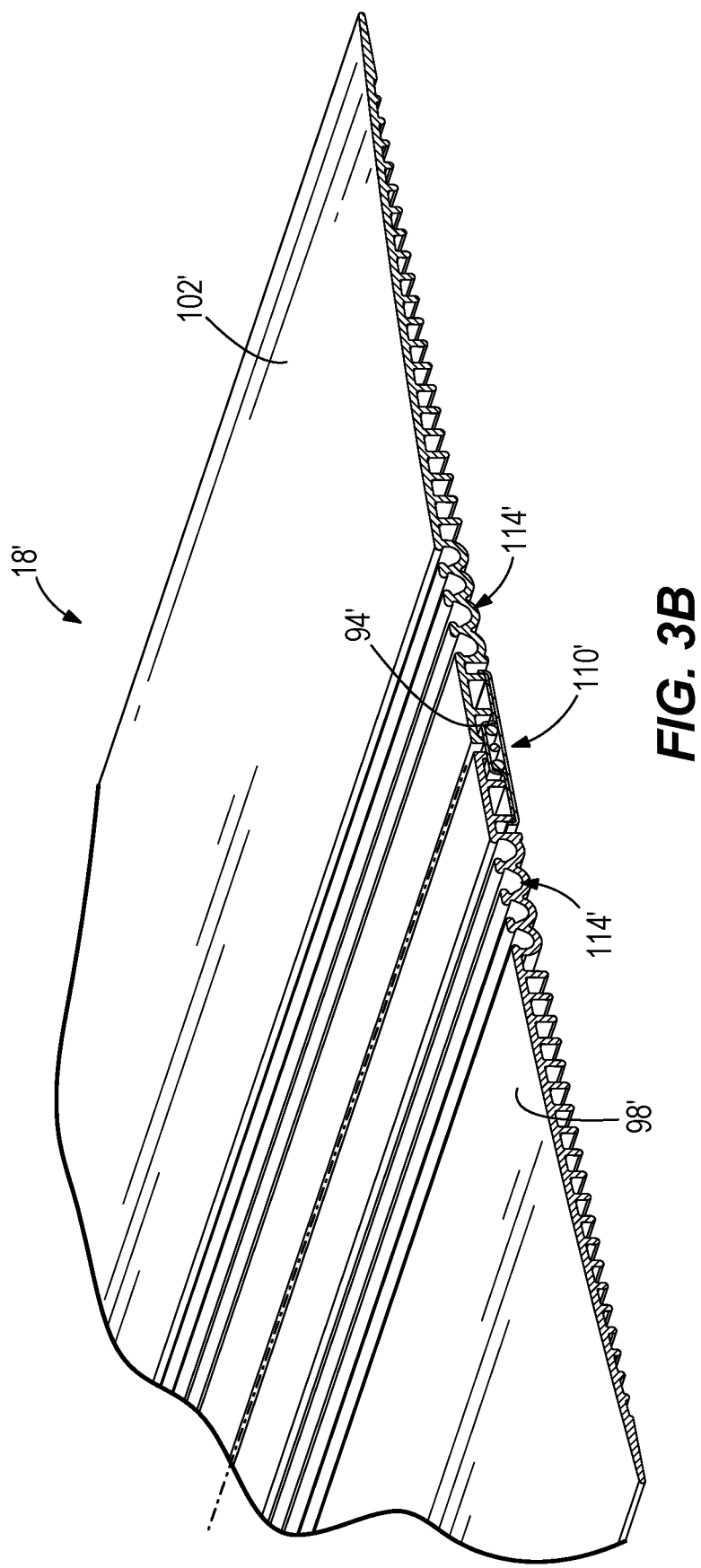
FIG. 3B is a perspective cross-sectional view of a portion of another embodiment of a track embodying the invention.

Alternatively, with reference to FIG. 3B, the track 18' includes second and third outer portions 98', 102' that extend over a first, central portion 94' such that the outer portions 98', 102' are positioned on a top of the central portion 94'. Further, a respective end surface of each of the outer portions 98', 102' is positioned adjacent each other. As such, the illustrated second and third portions 98', 102' extend from above the top of the central portion 94' at an angle relative to the floor surface 50 such that the second and third portions 98, 102 are ramped (FIG. 3A) to a height above the central portion 94'. Similar to the first embodiment of the track 18 (FIG. 3A), the track 18' includes a main channel 110' and auxiliary channels 114' spaced from the main channel 110'. The main channel 110' is defined by the central portion 94' and is configured to receive the power cables 118A-118C. However, in this embodiment, each auxiliary channel 114' is defined by an outer surface of the second and third portions 98', 102'. The auxiliary channel 114' is configured to receive one or more data cables to supply a data connection from the power entry node 14 to the electrical hub 22.

With reference to FIG. 1, the track 18 has a length 122 measured along the longitudinal axis 106 between the first and the second ends 86, 90. The length 122 is selected to accommodate needs of the end user. Specifically, the track 18 is manufactured to a desired length of the end user. In some embodiments, the track 18 may be between 1 foot and 20 feet long. For example, the track 18 may be 1 foot, 3 feet, 6 feet, 12 feet, 15 feet, 18 feet, 20 feet, and the like, depending on the size of the room in which the power distribution system 10 is located and where in the room power is desired. In the embodiment illustrated in FIGS. 1 and 2, the first and second ends 86, 90 of the track 18 are manufactured as a single piece with the first portion 94.

Figure 20A:
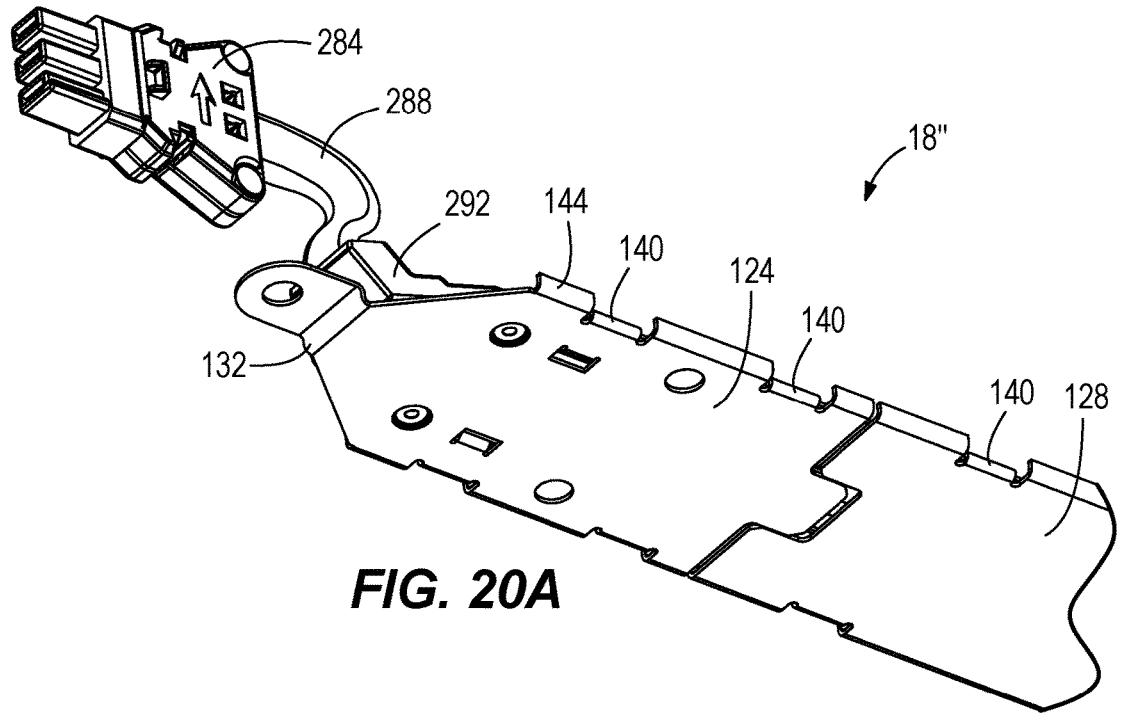
FIG. 20A is a bottom perspective view of yet another track embodying the invention.
Figure 20B:
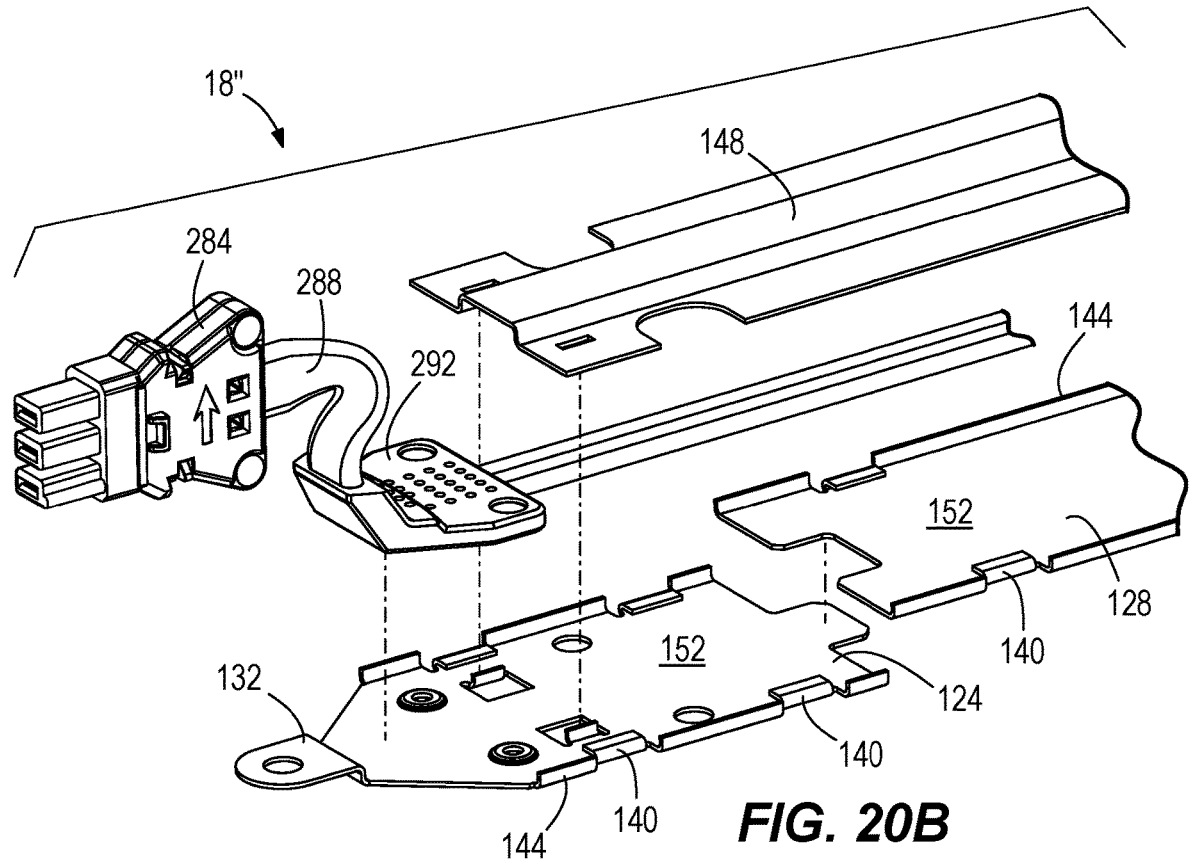
FIG. 20B is an exploded view of the track of FIG. 20B.

Alternatively, with reference to FIGS. 17A-17B and 20A-20B, the track 18" is formed from a plurality of sections 124, 128, 148, including two end sections 124 (only one of which is shown in FIGS. 17A-17B and 20A-20B) and a body section 128 between the two end sections 124. The end sections 124 are manufactured substantially identical and separate from the body section 128. The end sections 124 each have a predetermined length. For example, the predetermined length may be two inches. The end sections 124 each have an end 132 configured to adjustably couple to the power entry node 14 or electrical hub 22. The body section 128 is configured to form the main body of the track 18". The body section 128 has a length that is selectable to the desired length of the end user. Specifically, the body section 128 is extruded to the desired length during fabrication. The end sections 124 are then coupled to opposing ends of the body section 128. The track 18" may further include a plate section 148 positioned on a top surface 152 of the end sections 124 and the body section 128 such that the plate section 148 forms a stacked relationship with the end sections 124 and the body section 128. In the illustrated embodiment, the plurality of sections 124, 128, 148 of the track 18" are secured together by clinching (e.g., Tog-L-Loc®). In particular, the stacked sections 124, 128, 148 are punched (i.e., using a predetermined punch and die), thereby forming a protrusion 142A on one side of the stack and a corresponding cavity 142B on the opposite side. Each punch forms an "interlocking clinch joint" for securing the respective sections 124, 128, 148 together. In other embodiments, the plurality of sections 124, 128, 148 may be secured together by crimping. For example, as shown in FIGS. 20A-20B, the end sections 124 and the body section 128 include projections 140 positioned on sides 144 of the sections 124, 128. The projections 140 are configured to fold over edges of the plate section 148. Securing by clinching or crimping allows the same end sections 124 (which have relatively complex structures) to be produced and secured to any length of track. In some embodiments, the track 18" may include one or more body sections 124 for increasing the length of the track 18'''. Still further, in other embodiments, the plurality of sections 124, 128, 148 may be secured together by permanent fastening (e.g., rivets), welding, etc. in which the plate section 148 may or may not be utilized.

Figure 4A:
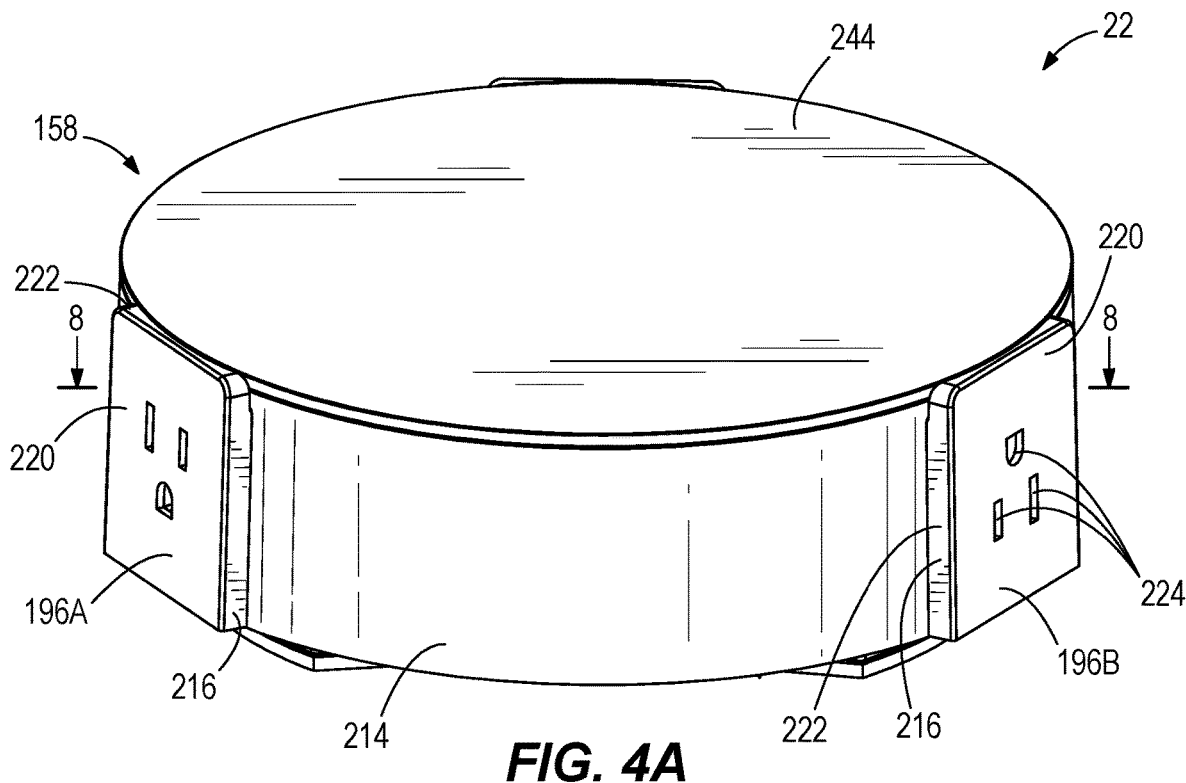
FIG. 4A is a perspective view of the electrical hub of FIG. 1, the electrical hub including a housing.
Figure 4B:
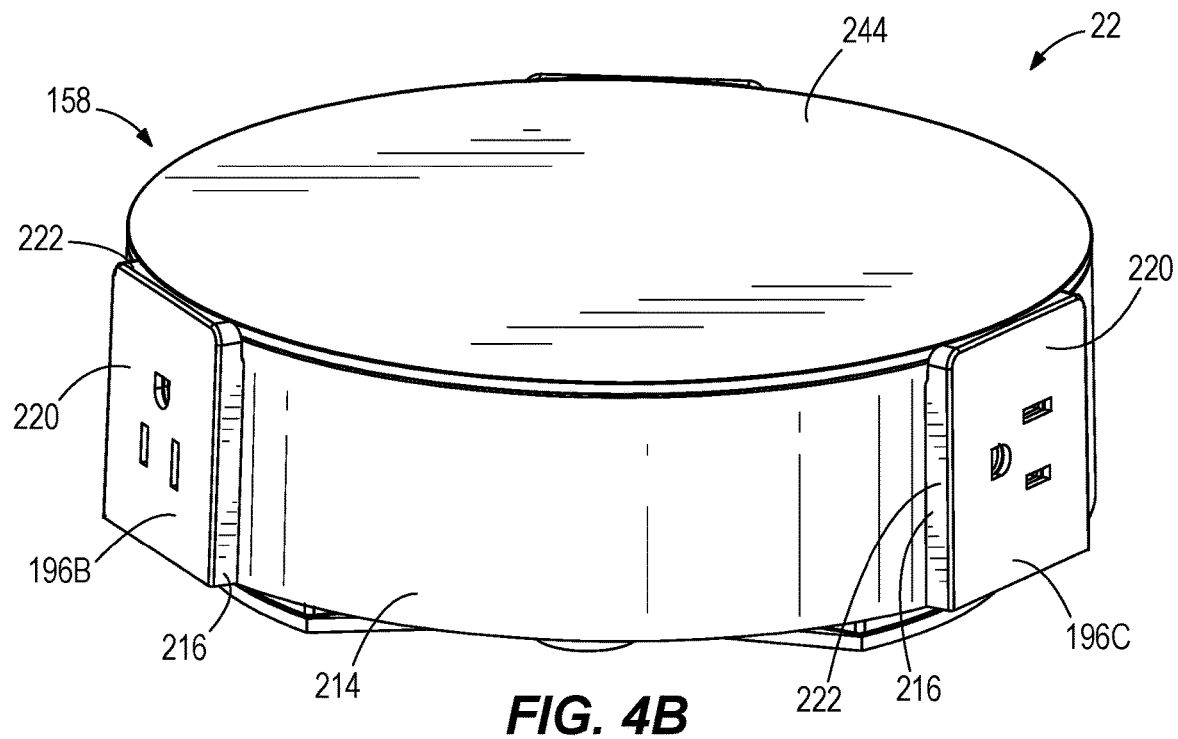
FIG. 4B is another perspective view of the electrical hub of FIG. 1.
Figure 5:
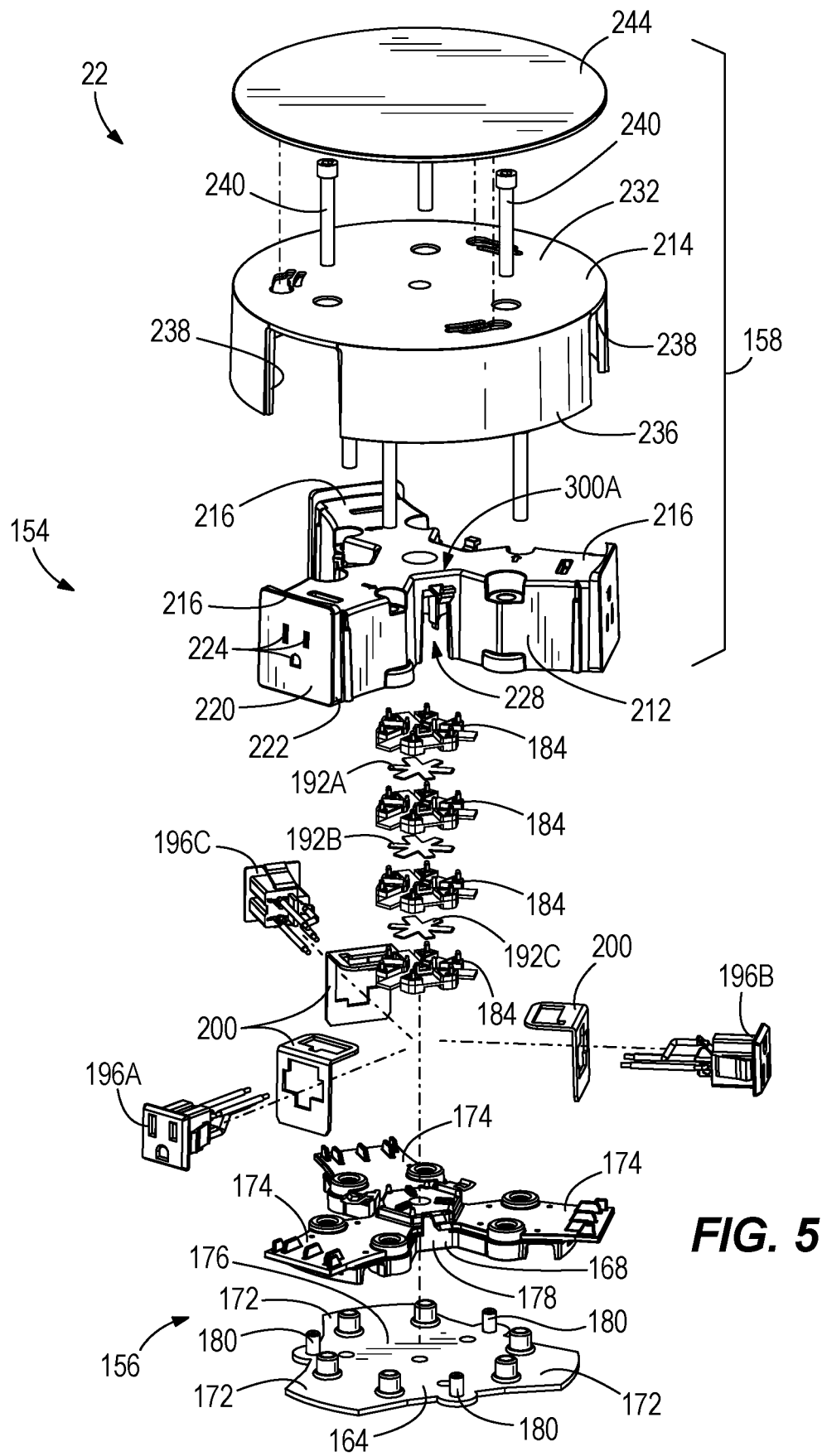
FIG. 5 is an exploded view of the electrical hub of FIG. 1, the electrical hub including a baseplate enclosed by the housing of FIG. 4A.
Figure 6:
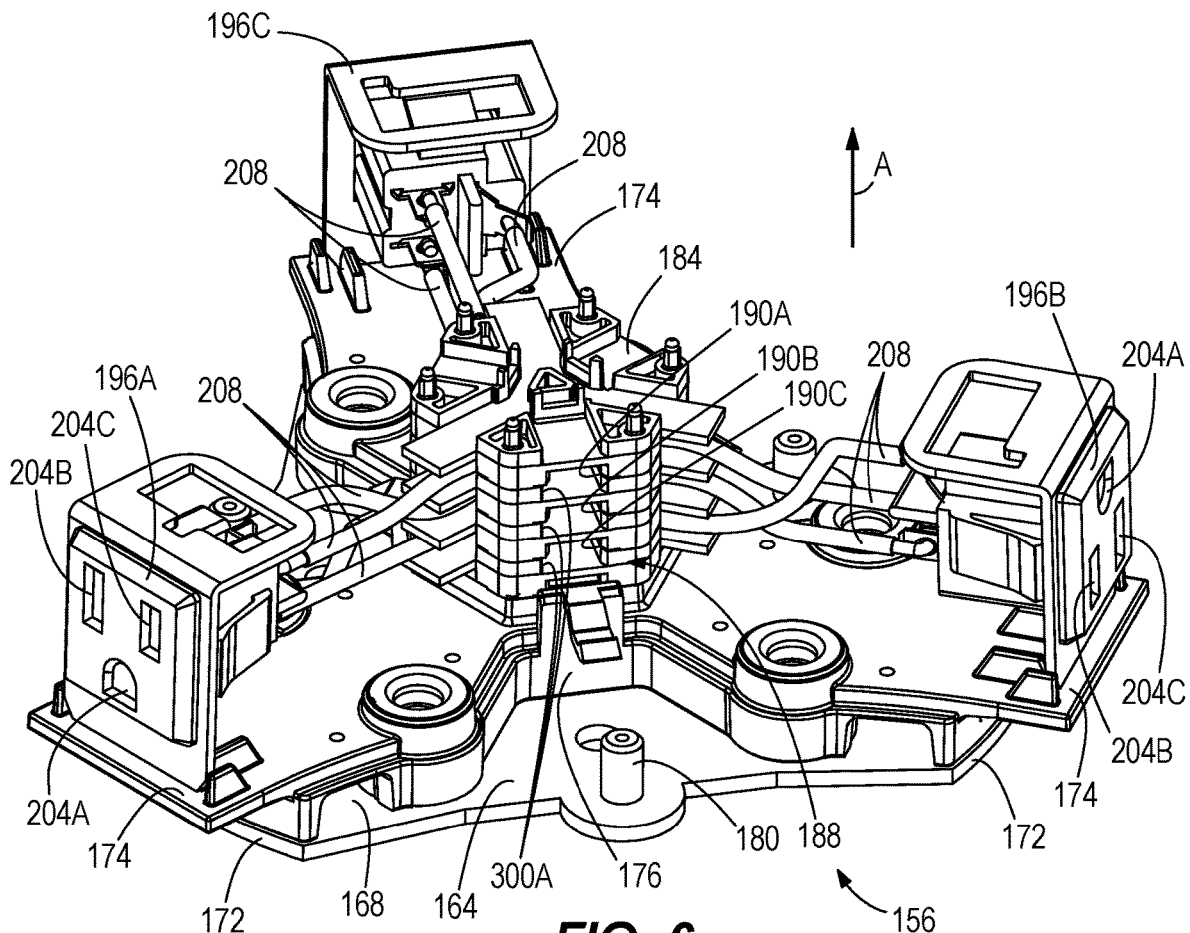
FIG. 6 is a perspective view of the baseplate of FIG. 5.
Figure 8:
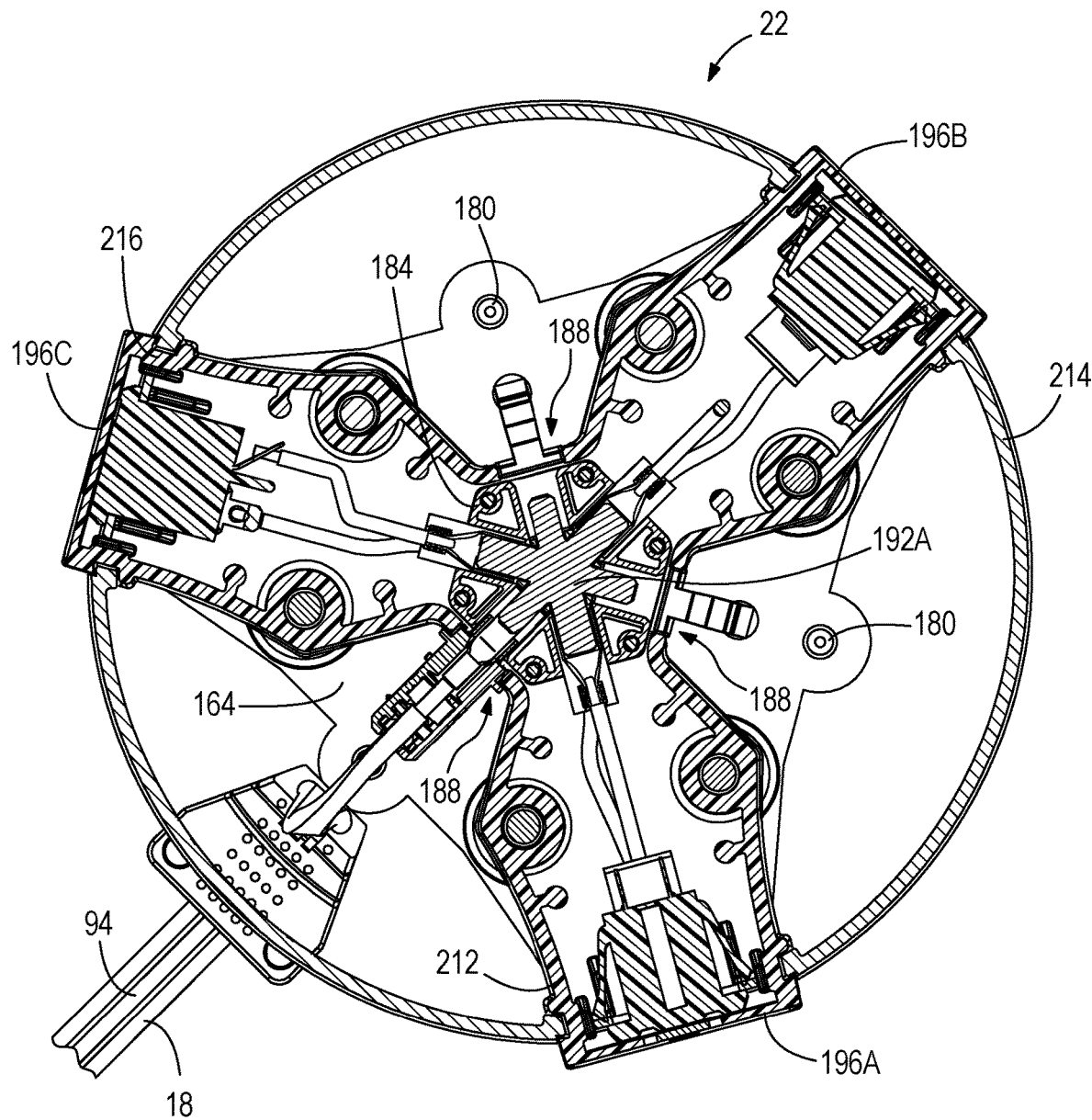
FIG. 8 is a cross-sectional view of the electrical hub taken along line 8-8 in FIG. 4A.

With reference to FIGS. 1, 4A-6, and 8, the electrical hub 22 includes a hub housing assembly 154. The hub housing assembly 154 includes a housing 158 and a platform 168. The platform 168 may be termed as the "lower housing" of the hub housing assembly 154. Further, the hub housing assembly 154 is coupled to a body or baseplate 156 of the electrical hub 22. The illustrated baseplate 156 includes a plate 164 (FIGS. 5 and 6). The plate 164 and the platform 168 each include three arm portions 172, 174, respectively, extending from a center portion 176, 178. The illustrated arm portions 172, 174 are circumferentially spaced apart by about 120 degrees relative to each other (FIG. 8). The plate 164 includes three pins 180. Each pin 180 extends at a position intermediate two of the adjacent arms portions 172, 174. In the illustrated embodiment, each pin 180 is circumferentially spaced about 60 degrees relative to the adjacent arm portions 172, 174.

Figure 9:
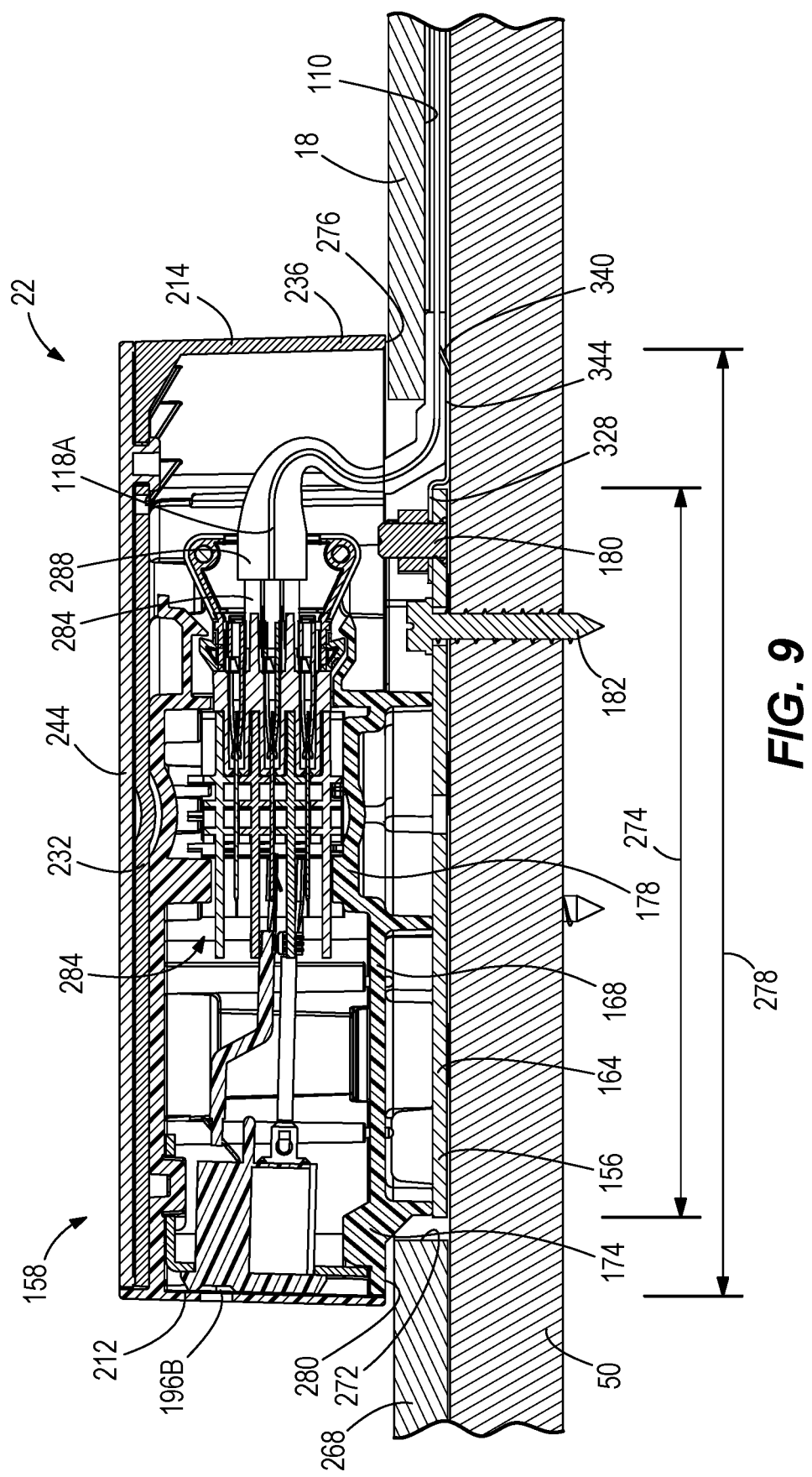
FIG. 9 is a cross-sectional view of the electrical hub taken along line 9-9 in FIG. 1.

With reference to FIG. 9, the baseplate 156 is coupled to the floor surface 50. The illustrated baseplate 156 is coupled to the floor surface by fasteners 182 (e.g., screws). Specifically, the fasteners 182 extend through the plate 164 into the floor surface 50. As such, the electrical hub 22 (i.e., the hub housing assembly 154) is securely coupled to the floor surface 50 via the baseplate 156.

The electrical hub 22 also includes a plurality of wafers 184 (FIGS. 5, 6, and 8). The illustrated electrical hub 22 includes four wafers 184 positioned on the center portion 176. The wafers 184 are supported by the platform 168 (i.e., the center portion 178). The wafers 184 are stacked on top of each other in a vertical direction A (i.e., a direction perpendicular to the longitudinal axis 106 of the track 18) such that the plurality of wafers 184 defines a set of terminals 188 (FIG. 6). The illustrated set of terminals 188 includes a ground terminal 190A, a hot terminal 190B, and a neutral terminal 190C. The ground, hot, and neutral terminals 190A, 190B, 190C may correspond to the ground, hot, and neutral power cables 118A, 118B, 118C of the track 18. Furthermore, the wafers 184 may define more than one set of terminals 188. For example, the illustrated plurality of wafers includes three sets of terminals 188 (FIG. 8). Each set of terminals 188 is positioned intermediate two of the arm portions 172, 174. In the illustrated embodiment, the sets of terminals 188 are each circumferentially spaced apart by about 120 degrees relative to each other. Each set of terminals 188 is circumferentially spaced apart by about 60 degrees relative to the adjacent arm portions 172 174. Each illustrated pin 180 is positioned in front of each of the set of terminals 188. The sets of terminals 188 are electrically connected to the plurality of power cables 118A, 118B, 118C.

With reference to FIG. 5, an electrode 192A, 192B, 192C is positioned between each pair of adjacent wafers 184 such that the electrical hub 22 includes three electrodes 192A, 192B, 192C. Each electrode 192A, 192B, 192C corresponds to one of the ground, the hot, and the neutral terminals 190A, 190B, 190C and to one of the power cables 118A, 118B, 118C of the track 18. The wafers 184 are formed from insulating material such as plastic, and separate each of the electrodes 192A, 192B, 192C. The electrodes 192A, 192B, 192C are formed of conducting material such as metal. In the illustrated embodiment, each electrode 192A, 192B, 192C is formed as a monolithic element. In other embodiments, other suitable electrodes and insulating materials may be used to form the terminals 188.

With reference to FIGS. 1 and 4A-6, the electrical hub 22 further includes a plurality of power receptacles 196A, 196B, 196C. The power receptacles 196A, 196B, 196C are supported by the baseplate 156 (FIG. 6). The illustrated electrical hub 22 includes three power receptacles 196A, 196B, 196C. In other embodiments, the electrical hub 22 may include fewer or more power receptacles. A bracket 200 extending from and coupled to each arm portion 172 of the platform 168 supports each of the power receptacles 196A, 196B, 196C. As such, the power receptacles 196A, 196B, 196C are each circumferentially spaced apart by about 120 degrees relative to each other. The power receptacles 196A, 196B, 196C each include ground, hot, and neutral contacts 204A, 204B, 204C (FIG. 6) configured to receive contacts of a plug.

As shown in FIG. 6, each of the power receptacles 196A, 196B, 196C includes wires 208 extending into the wafers 184. The illustrated power receptacles 196A, 196B, 196C include ground, hot, and neutral wires 208 such that each of the power receptacles 196A, 196B, 196C is wired to the plurality of wafers 184 (i.e., the ground, the hot, and the neutral wires 208 are electrically connected to the ground, hot, and neutral electrodes 192A, 192B, 192C, respectively, of the wafers 184). As such, the power receptacles 196A, 196B, 196C are electrically connected to the plurality of wafers 184. In addition, the power receptacles 196A, 196B, 196C may be wired such that the orientation of any one of the power receptacles 196A, 196B, 196C may be the same or different. For example, as shown in FIGS. 4A and 4B, the illustrated electrical hub 22 includes three power receptacles 196A, 196B, 196C, in which each power receptacle 196A, 196B, 196C includes a different orientation (e.g., the ground contact 204A is positioned lower, higher, and to a side of the hot/neutral contacts 204B/204C for one of the three power receptacles 196A, 196B, 196C, respectively).

Figure 19:
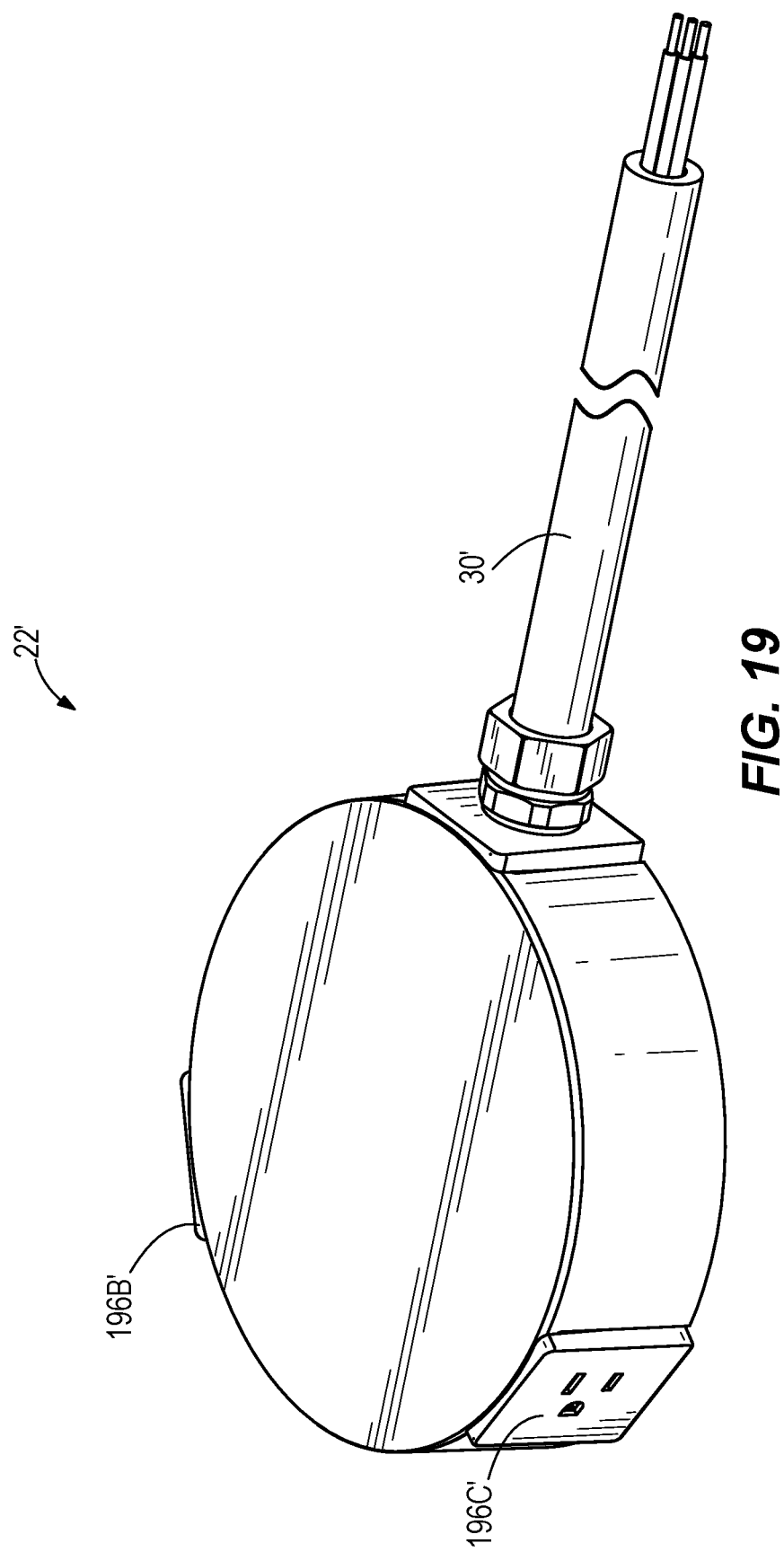
FIG. 19 is a perspective view of another electrical hub.

With reference to FIG. 19, alternatively, the electrical hub 22' may include a conduit 30' of the power supply such that the electrical hub 22' is electrically connected to the building's power supply or other power system (e.g., the furniture system 48). The connection is a hard wire connection (i.e., relatively permanent connection). For example, in the illustrated embodiment, the electrical hub 22' includes only two power receptacles 196B', 196C', and the conduit 30' extends from the electrical hub 22' where the first power receptacle 196A of the electrical hub 22 is positioned. The electrical hub 22' may have a similar structure to the electrical hub 22 (e.g., wafers 184, sets of terminals 188, etc.) except for having the conduit 30' electrically connected (e.g., wired) to the wafers 184 instead of one of the power receptacles 196A, 196B, 196C (e.g., the first power receptacle 196A) wired to the wafers 184. As such, the electrical hub 22' is configured as the power entry node for receiving the power from the power supply and supplying the power to the power distribution system 10 (e.g., the electrical hubs 22).

With reference to FIGS. 4A-5 and 9, the illustrated housing 158 includes a plurality of housing members 212, 214, 244. Specifically, the first housing member 212 forms a portion of the hub housing assembly 154. As such, the first housing member 212 may be termed as the "upper housing" of the hub housing assembly 154. The first housing member 212 is coupled to the platform 168. Further, the second and third housing members 214, 244 partially and/or completely surround the first housing member 212. Specifically, the illustrated first housing member 212 has three arm portions 216 corresponding to the three power receptacles 196A, 196B, 196C of the electrical hub 22 (FIG. 5). In addition, each arm portion 216 has a face plate 220 positioned at an end 222. Each face plate 220 includes openings 224 corresponding to the ground, hot, and neutral contacts 204A, 204B, 204C of the power receptacles 196.

With reference to FIG. 5, the first housing member 212 also has a plurality of slots 228. The slots 228 are positioned between the adjacent arm portions 216 of the first housing member 212. The illustrated first housing member 212 includes three slots 228 corresponding to the three sets of terminals 188. Each slot 228 is configured to allow access to one of the sets of terminals 188 positioned between the power receptacles 196A, 196B, 196C. In the illustrated embodiment, the first housing member 212 is formed (e.g., molded) from a single piece. In addition, the first housing member 212 may be sealably coupled to the platform 168, such as by sonic welding, such that the first housing member 212 helps seal the electrical components within the hub housing assembly 154 of the electrical hub 22. As such, the first housing member 212 inhibits water from entering the hub housing assembly 154 and/or contacting the wafers 184 or the electrodes 192A-192C.

With reference to FIGS. 4A-5 and 9, the second housing member 214 encloses the plurality of wafers 184. The second housing member 214 also partially encloses the plurality of power receptacles 196A, 196B, 196C and the first housing member 212. The second housing member 214 is removably coupled to the first housing member 212. The illustrated second housing member 214 has a cylindrical shape, including a top 232 and a circular side wall 236 extending from the top 232 (FIGS. 4A and 4B). The side wall 236 includes windows 238 for the arm portions 216 of the first housing member 212 and the power receptacles 196A, 196B, 196C. As such, the side wall 236 circumferentially surrounds the internals of the electrical hub 22, including the first housing member 212, except for the end 222 of each of the arm portions 216 of the first housing member 212 extending outward past the side wall 236. This allows the end user to access power from the electrical hub 22 by inserting a plug into the openings 224 of the first housing member 212, thereby inserting contacts of the plug into the ground, hot, and neutral contacts 204A, 204B, 204C of the power receptacle 196A, 196B, 196C. The first housing member 212 is coupled to the platform 168 during manufacturing of the electrical hub 22, and the second housing member 214 is removably coupled to the first housing member 212, such as by fasteners (e.g., bolts 240 and the like), by an installer. As such, the installer is able to access the sets of terminals 188 (via the slots 228 of the first housing member 212) to connect the tracks 18, but not the wafers 184 themselves.

With reference to FIGS. 4A-5 and 18A-18B, the third housing member 244 covers the top 232 of the second housing member 214 to enhance the aesthetics of the electrical hub 22. In the illustrated embodiment, the third housing member 244 is removably coupled to the second housing member 214. For example, in one embodiment of the second housing member 214', with reference to FIGS. 18A-18B, the second housing member 214' defines grooves 248 positioned within the top 232'. Each groove 248 is configured to receive a projection 252 extending from a bottom of the third housing member 244'. The third housing member 244' is configured to rotate about a rotational axis defined by the wafers 184. Specifically, each groove 248 includes an enlarged recess 264 such that rotation of the third housing member 244' about the rotational axis 260 guides each projection 252 along the groove 248 toward or away from the respective recess 264. The third housing member 244' is in a first, secured position (FIG. 18B) when each projection 252 is not positioned within its respective recess 264; and a second, removable position when each projection 252 is positioned within its respective recess 264. As such, the illustrated third housing member 244' is removably coupled to the second housing member 214'. The third housing member 244' shown in FIGS. 18A-18B does not include any visible fasteners for securing to the second housing member 214' such that the completely assembled electrical hub 22 does not show any fasteners. Removal of the third housing member 244 allows access to the fasteners 240 of the second housing member 214 for removing the second housing member 214 and accessing the terminals 188 and connected tracks 18. The third housing member 244 may also be removably coupled to the first housing member 212. For example, with reference to FIG. 5, the third housing member 244 is removably coupled to the first housing member 212 through the top 232 by fasteners. In other embodiments, the third housing member 244 is removably coupled to the first housing member 212 by a snap-fit, friction fit, and the like.

With reference to FIG. 9, the electrical hub 22 is supported by the floor surface 50. Specifically, the baseplate 156 (e.g., the plate 164) is positioned adjacent the floor surface 50. In some embodiments, the floor surface 50 is covered by a material 268 (e.g., carpet, rug, vinyl, etc.). The baseplate 156 may be positioned adjacent the floor surface 50 and/or the material 268. For example, in the illustrated embodiment, the baseplate 156 is positioned within an opening or cut out 272 of the material 268. The illustrated cut out 272 has a width or diameter 274. The baseplate 156 has a corresponding width or diameter to fit within the cut out 272. In addition, the width or diameter 174 of the cut out 272 is smaller than a width or diameter 278 of the housing 158 such that the material 268 at least partially extends below the housing 158 (i.e., the first and second housing members 212, 214 and the platform 168). As such, the housing 158 is configured to form an overhang above the material 268. For example, in the illustrated embodiment, the side wall 236 includes a bottom edge 276, and the material 268 at least partially extends below the bottom edge 276 of the second housing member 214 into the electrical hub 22. In addition, the material 268 extends below a bottom edge 280 of the arm portions 174 of the platform 168. As such, the housing 158 (e.g., the platform 168) helps visually hide any imperfections in the material 268. These imperfections may occur during cutting of the material 268 to form the cut out 272 for installing the electrical hub 22.

Figure 7:
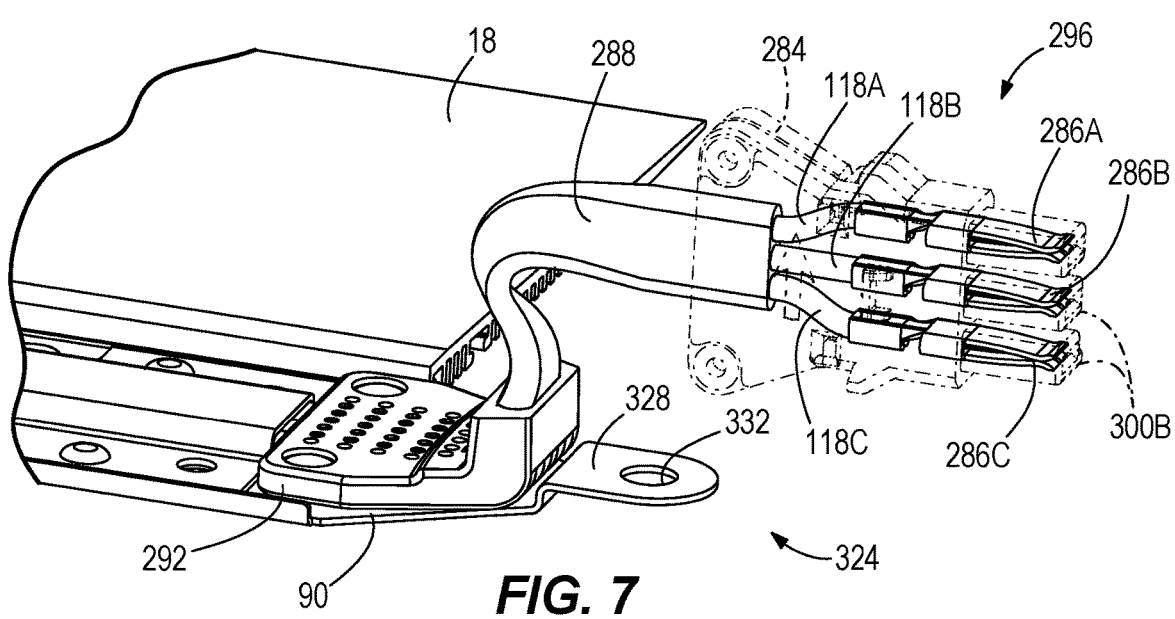
FIG. 7 is a perspective view of the track of FIG. 1, and a plug electrically connected to the track by a flexible sleeve.

With reference to FIG. 7, the power distribution system 10 includes a plug 284. The illustrated plug 284 includes a flexible sleeve 288 extending from the plug 284. A connector 292 is positioned at an opposite end of the sleeve 288. The connector 292 couples the plug 284 and the sleeve 288 to the first end 86 or the second end 90 of the track 18. In some embodiments, the connector 292 may be secured to the track 18 by fasteners (e.g., rivets, etc.). The connector 292, the sleeve 288, and the plug 284 thereby form a connector assembly 296. The sleeve 288 is configured to surround a portion of the plurality of power cables 118A, 118B, 118C between the track 18 and the plug 284. Specifically, the ground, the hot, and the neutral power cables 118A, 118B, 118C of the track 18 are configured to extend from the main channel 110 of the track 18, through the connector 292 and the sleeve 288, and into the plug 284. The plug 284 includes ground, hot, and neutral contacts 286A, 286B, 286C corresponding to the ground, the hot, and the neutral power cables 118A, 118B, 118C. As such, the plug 284 is electrically connected to the plurality of power cables 118A, 118B, 118C. Furthermore, the plug 284 is connectable to the electrical hub 22. More specifically, the plug 284 (i.e., the ground, hot, and neutral contacts 286A, 286B, 286C) is insertable into one of the sets of terminals 188 (i.e., the ground, hot, and neutral terminals 190A, 190B, 190C) of the plurality of wafers 184. The connector assembly 296 may also be used to electrically connect the power entry node 14 to the track 18. In this example, the plug 284 is insertable into one of the sets of terminals 34 of the power terminal member 26 of the power entry node 14, and the connector 292 is coupled to the first end 86 of the track 18 (FIG. 2). As such, the power cables 118A, 118B, 118C are electrically connected to the power entry node 14 and/or the electrical hub 22 by the connector assembly 296 (i.e., the plug 284).

With reference to FIGS. 6 and 7, the electrical hub 22 and the power entry node 14 may include keying features. Specifically, each set of terminals 34, 188 of the power entry node 14 and the electrical hub 22, respectively, define a plurality of non-symmetrical openings 300A. Each opening 300A is formed by adjacent wafers 184. The illustrated set of terminals 188 includes three openings 300A. The plug 284 includes one or more projections 300B defined by the ground, hot, and neutral contacts 286A, 286B, 286C. The projections 300B are configured to be received within the openings 300A when the plug 284 is inserted into the set of terminals 34, 188. In the illustrated embodiment, each of the contacts 286A, 286B, 286C has an associated projections 300B. In other embodiments, only some of the contacts 286A, 286B, 286C may have a projection 300B. In either situation, the plug 284 may be insertable only in one direction into the set of terminals 34, 188. In other embodiments, other suitable shapes of openings and projections may be used to form the keying features.

Figure 10:
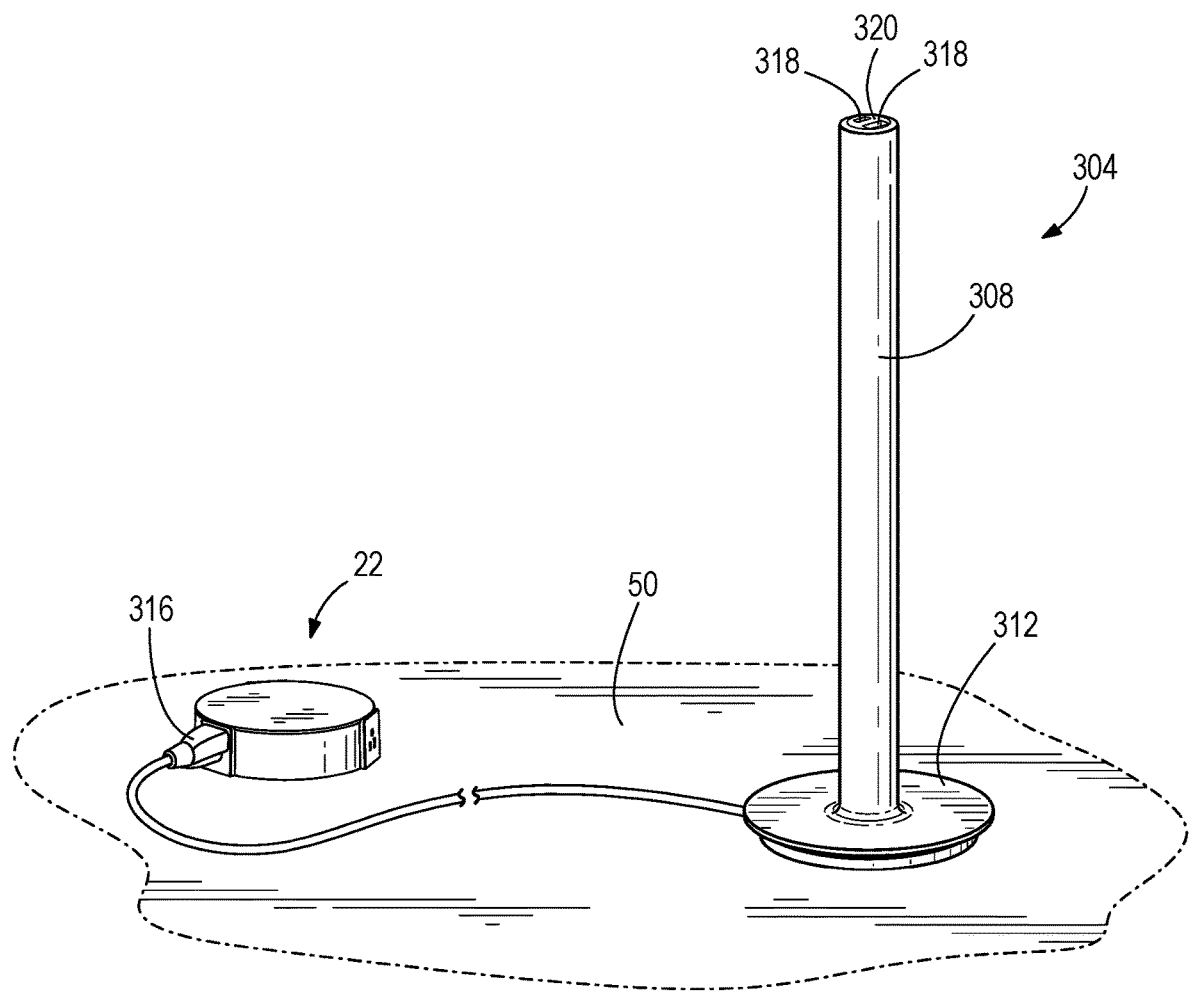
FIG. 10 is a perspective view of a tower electrically connected to the electrical hub of FIG. 1.
Figure 11A:
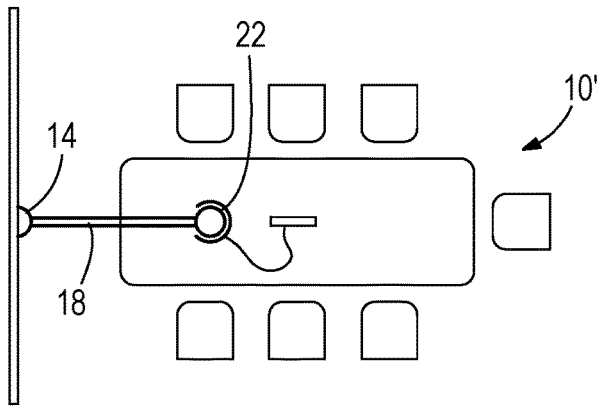
FIG. 11A is a schematic view of the power distribution system in a first configuration.
Figure 11B:
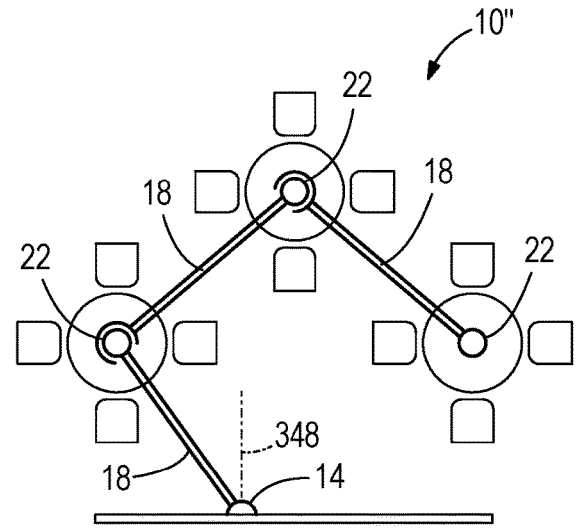
FIG. 11B is a schematic view of the power distribution system in a second configuration.
Figure 11C:
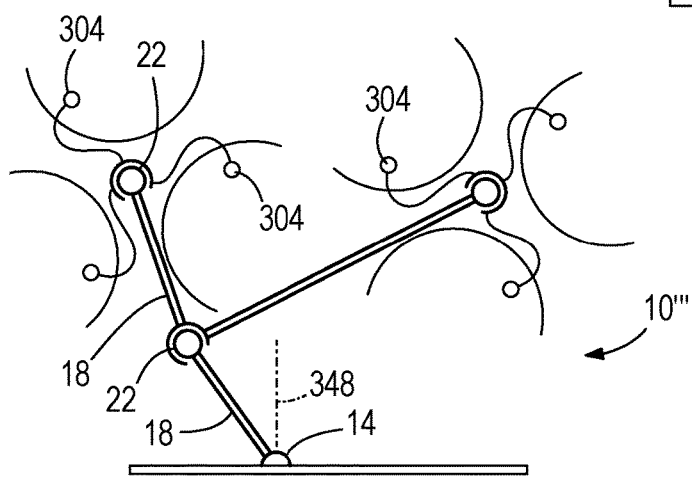
FIG. 11C is a schematic view of the power distribution system in a third configuration.

With reference to FIGS. 10 and 11C, the power distribution system 10 includes a power member or tower 304. The illustrated tower 304 includes a cylindrical body 308 and a base 312 coupled to the body 308. The base 312 is positioned adjacent the floor surface 50 such that the base 312 supports and facilitate balancing of the tower 304 on the floor surface 50. The tower 304 is electrically connected to the electrical hub 22 by a plug 316 inserted into one of the power receptacles 196A, 196B, 196C of the electrical hub 22. The tower 304 includes at least one power receptacle 318. The illustrated power receptacle 318 is positioned on a top face 320 of the tower 304. In the illustrated embodiment, the power receptacles 318 are USB ports. In other embodiments, the tower 304 may include other suitable types of power receptacles or combinations of power receptacles. The tower 304 is configured to provide power to the end user at a height that is spaced from the floor surface 50. The tower 304 may be further configured to provide power at any location in the room.

Figure 17A:
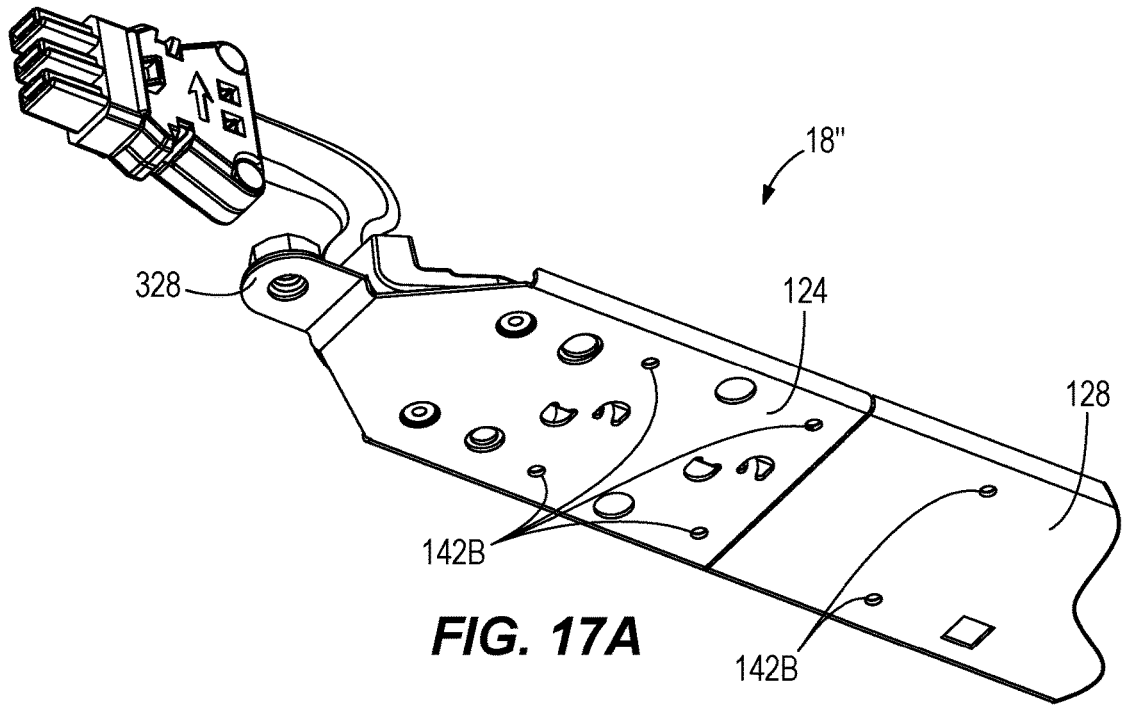
FIG. 17A is a bottom perspective view of another track embodying the invention.
Figure 17B:
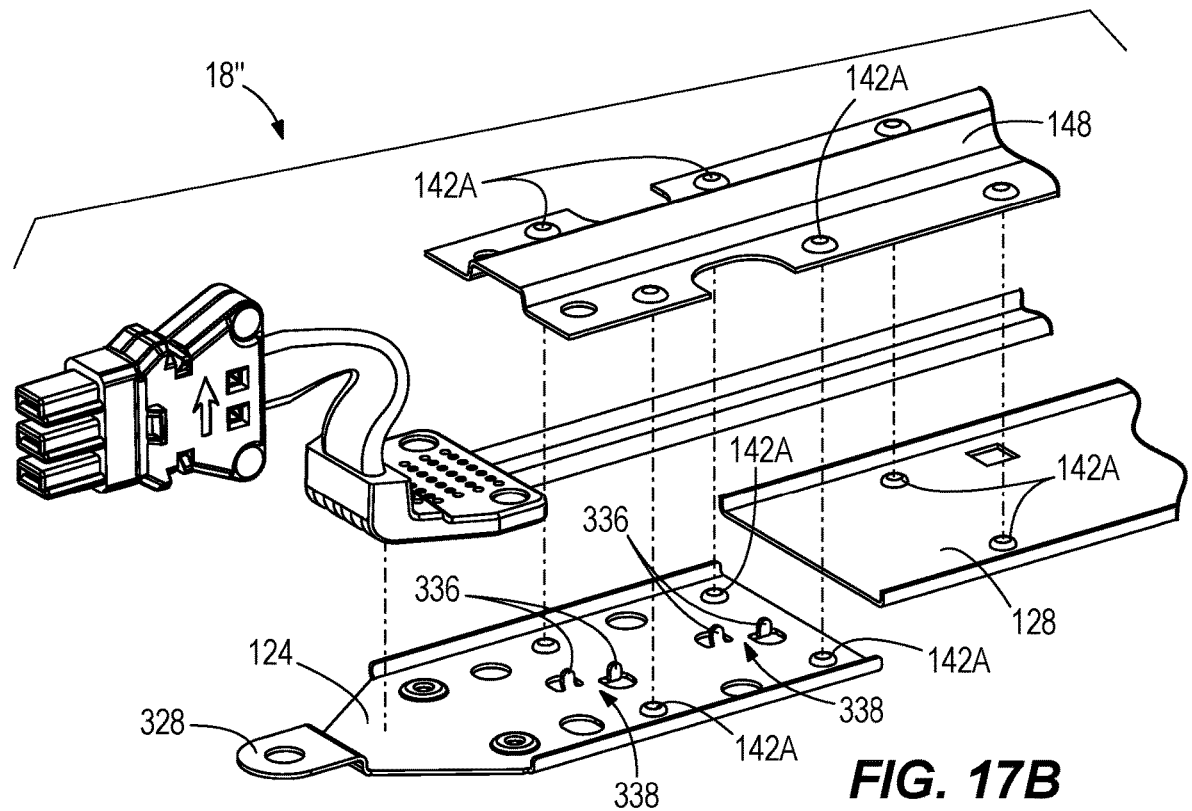
FIG. 17B is an exploded view of the track of FIG. 17B.
Figure 18A:
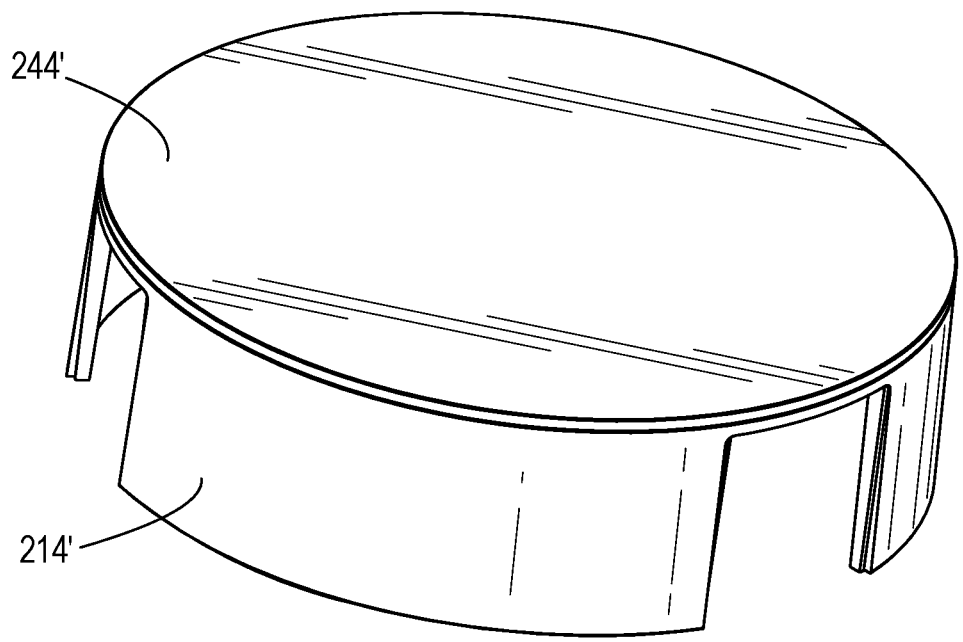
FIG. 18A is a top perspective view of a housing for use with the electrical hub of FIG. 4A.
Figure 18B:
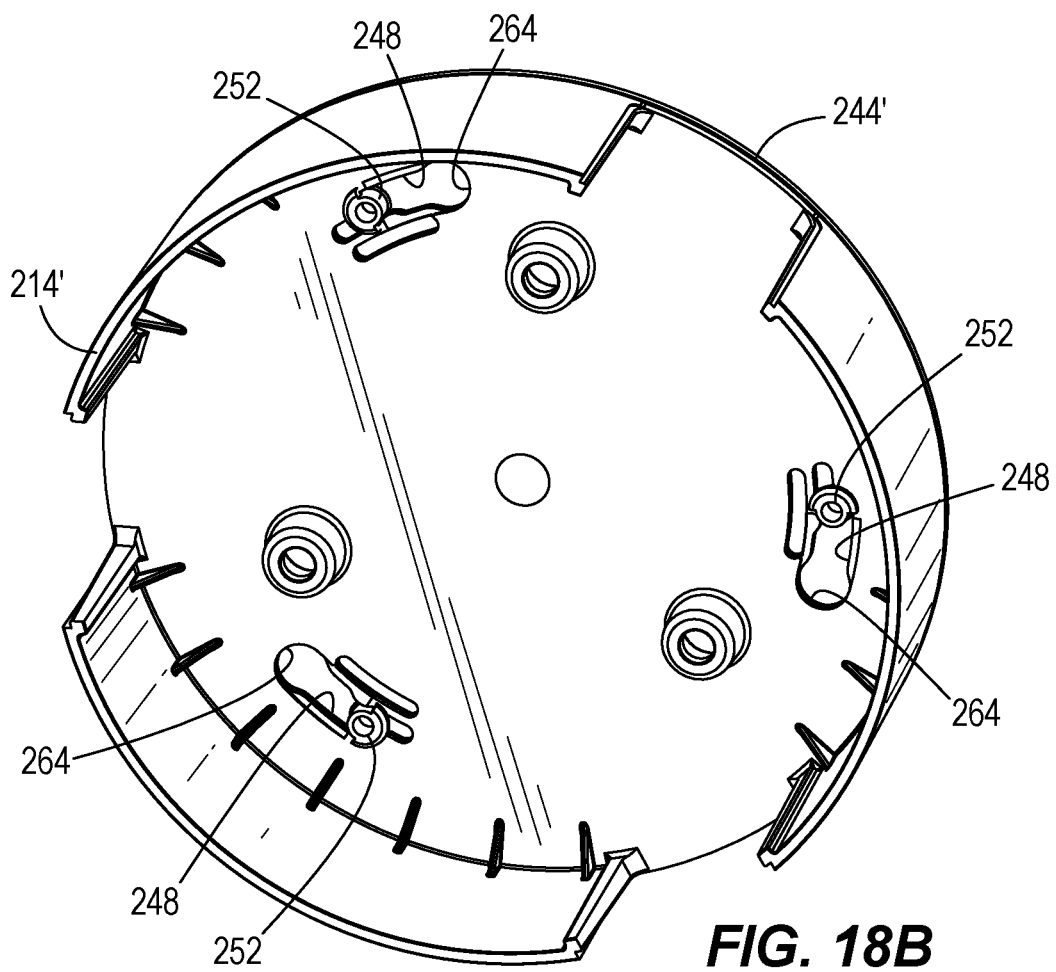
FIG. 18B is a bottom perspective view of the housing of FIG. 18A.

With reference to FIGS. 2, 6, and 7, the track 18 is movably coupled to the power entry node 14 and to the electrical hub 22. In the illustrated embodiment, the power entry node 14 is movably coupled to the first end 86 of the track 18 (or, depending on a user's perspective, the track 18 is movably coupled to the power entry node 14). Similarly, the electrical hub 22 is movably coupled to the second end 90 of track 18 (or, depending on a user's perspective, the track 18 is movably coupled to the electrical hub 22). Specifically, the track 18 includes an adjustment mechanism 324. The illustrated adjustment mechanism 324 includes an extending member or boss 328 positioned at both the first and second ends 86, 90 (FIGS. 2 and 7, respectively) or at the ends 132 of the track 18" (FIGS. 17A-17B). The boss 328 includes a hole 332 configured to receive the pin 62, 180 for rotating the track 18 about the pin 62, 180. As such, the adjustment mechanism 324 includes the boss 328 and the pin 62, 180. For example, as shown in FIG. 2, the pin 62 extends from the flange 54 of the power entry node 14 and is received within the hole 332 of the boss 328. As shown in FIGS. 6 and 7, the pin 180 of the baseplate 156 is configured to be received within the hole 332 of the boss 328. In other embodiments, the track 18 may include the pin 62, 180, and the power entry node 14 and the electrical hub 22 may define the hole 332 configured to receive the pin 62, 180.

With reference to FIG. 17B, the track 18 includes two sets of projections 336 extending from the end section 124. Each projection 336 in the respective set of projections 336 are spaced apart from each other such that the set of projections 336 define a gap 338 therebetween. The ground power cable 118A extends through the gap 338. The gap 338 is sized such that the ground power cable 118A is captured and in contact with the projections 336. As such, the projections 336 help ground the power distribution system to the building. More specifically, the projection 336 creates a ground path from the ground power cable 118A, to the track 18 (i.e., via the end section 124), to the pin 180 (FIG. 9) coupling the track 18 to the electrical hub 22, and to the baseplate 156 of the electrical hub 22, which is secured to the floor 50 of the building by the metal fasteners 182. In other embodiments, as illustrated in FIG. 9, the track 18 includes a barb or projection 340 extending from the ground power cable 118A. The barb 340 is positioned within the main channel 110 and extends to a bottom 344 of the track 18. In some embodiments, the barb 340 is crimped or soldered to the ground power cable 118A. Still further, in other embodiments, the ground power cable 118A may be electrically coupled directly to the baseplate 156 of the electrical hub 22 without going through the track 18.

With reference to FIGS. 11A-14, each track 18 is rotatable about one of the pins 62, 180 to adjust a direction at which the track 18 extends relative to the electrical hub 22 or the power entry node 14. For example, with respect to the adjustment mechanism between the track 18 and the electrical hub 22, the track 18 is movable (e.g., rotatable or pivotable) about the pin 180 to move the electrical hub 22 relative to the second end 90 of the track 18 (FIG. 14). In another example, with respect to the adjustment mechanism 324 between the track 18 and the power entry node 14, the track 18 is movable (e.g., rotatable or pivotable) about the pin 62 such that the power entry node 14 is movable relative to the first end 86 of the track 18 to adjust the direction at which the track 18 extends relative to the power entry node 14 connected to the power supply (FIGS. 12 and 13). The flexible sleeve 288 extending from the plug 284 allows the track 18 to move relative to the power entry node 14 and/or the electrical hubs 22 without interference from the power cables 118A, 118B, 118C.

In the embodiment shown in FIGS. 2 and 13, the power entry node 14 includes two tracks 18. Each track 18 may extend in a direction defined between an axis 348 extending perpendicular to the power entry node 14, and a maximum angle B at which the track can be moved relative to the axis 348. The illustrated maximum angle B is about 85 degrees for each track 18. As such, the track 18 is movable to the direction extending at an angle between the axis 348 and the maximum angle B of about 85 degrees. The installer adjusts the direction that the track 18 extends relative to the power entry node 14 using the adjustment mechanism 324 before covering the track 18 by the material 268 during installation of the power distribution system 10.

Figure 11D:
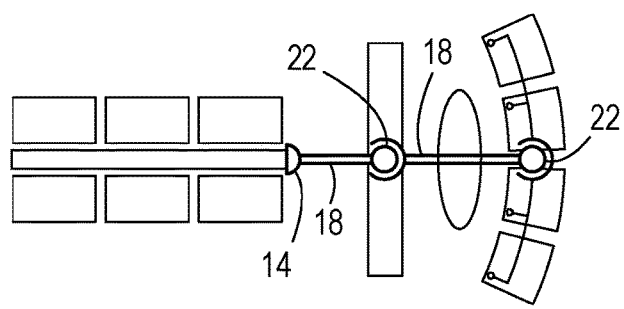
FIG. 11D is a schematic view of the power distribution system in a fourth configuration.

As shown in FIGS. 11A and 11D, a single track 18 extends perpendicular from the power entry node 14. As shown in FIGS. 11B and 11C, a single track 18 extends at an angle of about 45 degrees from the power entry node 14 relative to the axis 348.

With reference to FIGS. 8 and 12, the electrical hub 22 may be movable relative to the second end 90 of the track 18 to change a position of the power receptacles 196A, 196B, 196C of the electrical hub 22 relative to the track 18. Specifically, adjusting the angle between the track 18 and the electrical hub 22 allows the power receptacle 196A, 196B, 196C to be positioned in different locations relative to the track 18 and allows additional tracks 18 to extend from the electrical hub 22 in different directions. As such, the installer may select the position of the electrical hub 22 relative to the track 18 depending on the needs of a particular room.

With reference to FIGS. 12 and 14, more than one track 18 can be coupled to each electrical hub 22. For example, as shown in FIG. 12, a second track 18 extends from the electrical hub 22, creating a linear arrangement of power entry node 14, first track 18, electrical hub 22, and second track 18. The configuration shown in FIG. 12 also includes a second electrical hub 22 coupled to an end of the second track 18 opposite from the first electrical hub 22, and a third track 18 extending from the second electrical hub 22. As shown in FIG. 14, three tracks 18 extend from the electrical hub 22, creating a hub and spoke type arrangement.

Each track 18 is substantially the same and includes the first and second ends 86, 90, the longitudinal axis 106 extending through the first and second ends 86, 90, the plurality of channels 110, 114, and the power cables 118A, 118B, 118C positioned within the main channel 110. The power cables 118A, 118B, 118C of each of the tracks 18 are electrically connected to the electrical hub 22. As such, the electrical hub 22 connects to one track 18 having the power cables 118A, 118B, 118C that supply power to the electrical hub 22, and connects to one or two other tracks 18 having power cables 118A, 118B, 118C that draw power from the electrical hub 22. In the illustrated embodiment, one of the three sets of terminals 188 of the electrical hub 22 connected to the power cables 118A, 118B, 118C supplying the power may be defined as an input set of terminals, and the other two sets of terminals 188 that may be electrically connected to the power cables 118A, 118B, 118C drawing power from the electrical hub 22 may be defined as output sets of terminals. In other words, the terms "input" and "output" indicate whether power is being supplied or being drawn, respectively, at the set of terminals. With respect to the power entry node 14, the sets of terminals are output sets of terminals in which power is being drawn from the power entry node 14 to supply power to the electrical hub 22.

With reference to FIG. 14, each track 18 defines the longitudinal axis 106 extending from the electrical hub 22. The tracks 18 are movable (e.g., pivotable or rotatable) relative to the electrical hub 22 to change the angles at which the longitudinal axes 106 extend from the electrical hub 22 and/or the angles between the longitudinal axes 106 of adjacent tracks 18. In some embodiments, each track 18 may be adjustable through an arc of about 90 degrees relative to the electrical hub 22. The tracks 18 extending from the electrical hub 22 may be defined as a first track, a second track, and a third track having the first, second, and third longitudinal axes 106, respectively. The first longitudinal axis 106 of the first track and the second longitudinal axis 106 of the second track may define an angle C therebetween. For example, as shown in FIG. 14, the angle is about 120 degrees. The first longitudinal axis of the first track and the third longitudinal axis of the third track may also define an angle therebetween. The angle is adjustable by moving the first track, the second track, and/or the third track relative to the electrical hub 22. The installer adjusts the angle using the adjustment mechanism 324. The configuration of the connector assembly 296 (e.g., the plug 284, sleeve 288, and the connector 292) facilitates the adjustment of the angle C. Specifically, the ground, the hot, and the neutral power cables 118A, 118B, 118C of the connector assembly 296 are flexible (e.g., able to bend or twist with the movement of the track 18) such that desired angles between adjacent tracks 18 and the electrical hub 22 are achieved.

With reference to FIGS. 1 and 11A-12, the power distribution system 10, 10', 10", 10''', 10"", and 10"''' is configured to selectively provide power to different locations in a room using the power entry node 14, a plurality of tracks 18, and a plurality of electrical hubs 22. For example, as illustrated in FIG. 11B, the power distribution system 10" includes the power entry node 14, three electrical hubs 22, and three tracks 18 electrically connected to the power entry node 14 and/or electrical hubs 22. For example, as illustrated in FIG. 11C, the power distribution system 10''' includes the power entry node 14, three electrical hubs 22, and three tracks 18 electrically connected to the power entry node 14 and/or electrical hubs 22. In addition, the power distribution system 10''' includes six towers 304 electrically connected to the electrical hubs 22. For example, as illustrated in FIG. 12, the power distribution system 10"" includes the power entry node 14, two electrical hubs 22, and three tracks 18 electrically connected to the power entry node 14 and/or electrical hubs 22. The angle that the tracks 18 extend relative to the power entry node 14 and/or the electrical hubs 22 allows the power to be provided at the different locations. In addition, the towers 204 may further facilitate providing the power at the different locations.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A power distribution system comprising:
   a track having a first end, a second end opposite the first end, and a longitudinal axis extending through the first and second ends, the track defining a channel extending along the longitudinal axis;
   a plurality of power cables positioned within the channel;
   an electrical hub including
      a body coupled to the second end of the track,
      a plurality of wafers supported by the body and stacked on top of each other to define a set of terminals, the set of terminals electrically connected to the plurality of power cables, and
      a power receptacle supported by the body and electrically connected to the plurality of wafers; and
   a plug electrically connected to the plurality of power cables and having a plurality of projections and a plurality of contacts, each contact positioned within an associated projection of the plurality of projections, and wherein the plurality of projections is insertable into the set of terminals to electrically connect the plurality of contacts to the set of terminals.

2. The power distribution system of claim 1, wherein the plurality of wafers is stacked in a vertical direction.

3. The power distribution system of claim 1, wherein the plurality of wafers includes four wafers.

4. The power distribution system of claim 1, wherein the set of terminals includes a ground terminal, a hot terminal, and a neutral terminal.

5. The power distribution system of claim 1, wherein a monolithic electrode is positioned between each pair of adjacent wafers of the plurality of wafers.

6. The power distribution system of claim 1, wherein the electrical hub includes a housing coupled to the body, the housing enclosing the plurality of wafers and partially enclosing the power receptacle.

7. The power distribution system of claim 6, wherein the housing includes a plurality of housing members, and wherein at least one of the housing members is formed from one piece and configured to seal the electrical hub.

8. The power distribution system of claim 6, wherein the electrical hub is configured to be supported on a surface covered by a material, wherein a portion of the body is positioned within a cut out of the material, and wherein the cut out has a width smaller than a width of the housing such that the housing forms an overhang above the material.

9. The power distribution system of claim 1, wherein the electrical hub includes a plurality of power receptacles supported by the body.

10. The power distribution system of claim 9, wherein the electrical hub includes three power receptacles each circumferentially spaced apart by 120 degrees.

11. The power distribution system of claim 1, wherein the track is a first track and the set of terminals is a set of input terminals, wherein the plurality of wafers defines a set of output terminals, and further comprising:
   a second track having a third end coupled to the body of the electrical hub, a fourth end opposite the third end, and a longitudinal axis extending through the third and fourth ends, the second track defining a channel; and
   a second plurality of power cables positioned within the channel of the second track, the second plurality of power cables electrically connected to the set of output terminals.

12. The power distribution system of claim 11, wherein the set of output terminals is a first set of output terminals, the plurality of wafers defines a second set of output terminals, and further comprising:
   a third track having a fifth end coupled to the body of the electrical hub, a sixth end opposite the fifth end, and a longitudinal axis extending through the fifth and sixth ends, the third track defining a channel; and
   a third plurality of power cables positioned within the channel of the third track, the third plurality of power cables electrically connected to the second set of output terminals.

13. The power distribution system of claim 12, wherein the set of input terminals, the first set of output terminals, and the second set of output terminals are circumferentially spaced apart by 120 degrees.

14. The power distribution system of claim 1, further comprising a connector assembly having the plug, a connector coupled to the second end of the track, and a flexible sleeve extending between the plug and the connector.

15. An electrical hub for use with a power distribution system, the power distribution system including a track and a plurality of power cables positioned within the track, the electrical hub comprising:
- a body configured to couple to an end of the track of the power distribution system;
- a plurality of wafers supported by the body and stacked on top of each other to define a set of terminals, the set of terminals configured to electrically connect to the plurality of power cables of the power distribution system;
- a power receptacle supported by the body and electrically connected to the plurality of wafers; and
- a housing coupled to the body, the housing enclosing the plurality of wafers and partially enclosing the power receptacle, wherein the electrical hub is configured to be supported on a surface covered by a material, wherein a portion of the body is positioned within a cut out of the material, and wherein the cut out has a width smaller than a width of the housing such that the housing forms an overhang above the material.

16. The electrical hub of claim 15, wherein the plurality of wafers is stacked in a vertical direction.

17. The electrical hub of claim 15, wherein the plurality of wafers includes four wafers.

18. The electrical hub of claim 15, wherein a monolithic electrode is positioned between each pair of adjacent wafers of the plurality of wafers.

19. The electrical hub of claim 15, further comprising a plurality of power receptacles supported by the body.

20. An electrical hub for use with a power distribution system, the power distribution system including a first track, a second track, a first plurality of power cables positioned within the first track, and a second plurality of power cables positioned within the second track, the electrical hub comprising:
- a body configured to couple to an end of the first track of the power distribution system and to an end of the second track of the power distribution system;
- a plurality of wafers supported by the body and stacked on top of each other to define a set of input terminals and a set of output terminals, the set of input terminals configured to electrically connect to the first plurality of power cables of the power distribution system to receive power from the first plurality of power cables, the set of output terminals configured to electrically connect to the second plurality of power cables of the power distribution system to distribute power to the second plurality of power cables;
- a power receptacle supported by the body and electrically connected to the plurality of wafers; and
- a housing coupled to the body, the housing enclosing the plurality of wafers and partially enclosing the power receptacle.

* * * * *